United States Patent [19]

Bishop

[11] 4,393,492

[45] Jul. 12, 1983

[54] DIGITAL SUBSCRIBER CARRIER SYSTEM INCLUDING DROP TERMINALS AND BYPASS AND LOOPBACK MEANS AND ALARM INDICATION MEANS

[75] Inventor: Larry D. Bishop, Colleyville, Tex.

[73] Assignee: Reliance Electric Co., Cleveland, Ohio

[21] Appl. No.: 234,797

[22] Filed: Feb. 17, 1981

[51] Int. Cl.³ ............................ H04J 3/08; H04J 3/14
[52] U.S. Cl. ....................................... 370/15; 370/55; 371/11; 375/108
[58] Field of Search ...................... 340/825.01, 825.05, 340/825.06, 825.16, 292; 370/13, 14, 15, 16, 55, 100, 119; 375/108; 330/51; 371/7, 8, 11, 71; 179/175.2 R, 175.3 S, 175.3 F

[56] References Cited

U.S. PATENT DOCUMENTS

| | | | |
|---|---|---|---|
| 3,458,661 | 7/1969 | Forde et al. | 370/15 |
| 3,519,935 | 7/1970 | Hochgraf | 455/8 |
| 3,876,983 | 4/1975 | Zafiropulo et al. | 371/11 |
| 4,002,847 | 1/1977 | Dail | 370/15 |
| 4,035,770 | 7/1977 | Sarle | 371/11 |
| 4,131,761 | 12/1978 | Giusto | 370/55 |
| 4,159,470 | 6/1979 | Strojny et al. | 340/825.01 |
| 4,245,343 | 1/1981 | Frey | 371/11 |

Primary Examiner—Benedict V. Safourek

Attorney, Agent, or Firm—Michael M. Rickin

[57] ABSTRACT

A multi-channel digital subscriber carrier system for serving a multiplicity of subscribers one or more of whom may be located at points between the central office and the subscriber (furthest remote) terminal. One or more drop terminals are provided to serve these inbetween subscribers. Each terminal has a receiver section for recovering the clock signal generated by a master oscillator located in the central office. The receiver section also synchronizes on the received signal and generates signals indicating times of occurrence of the channels in the received signal. The transmitter section of each terminal uses the above signals and the recovered clock to generate a digital signal wherein messages from the subscribers at the terminal are inserted in those channels associated with the subscribers for the messages received from the office for the subscribers. Each terminal has associated therewith a circuit for bypassing the terminal upon the occurrence of a terminal fault condition. When the drop terminals are connected to the inward cable pair each terminal has associated therewith a circuit for looping back the system at the terminal upon the occurrence of a cable fault condition. The loopback circuit operates automatically and independently of the central office. An alarm mechanism is provided to allow a serviceman to easily locate the fault condition.

29 Claims, 17 Drawing Figures

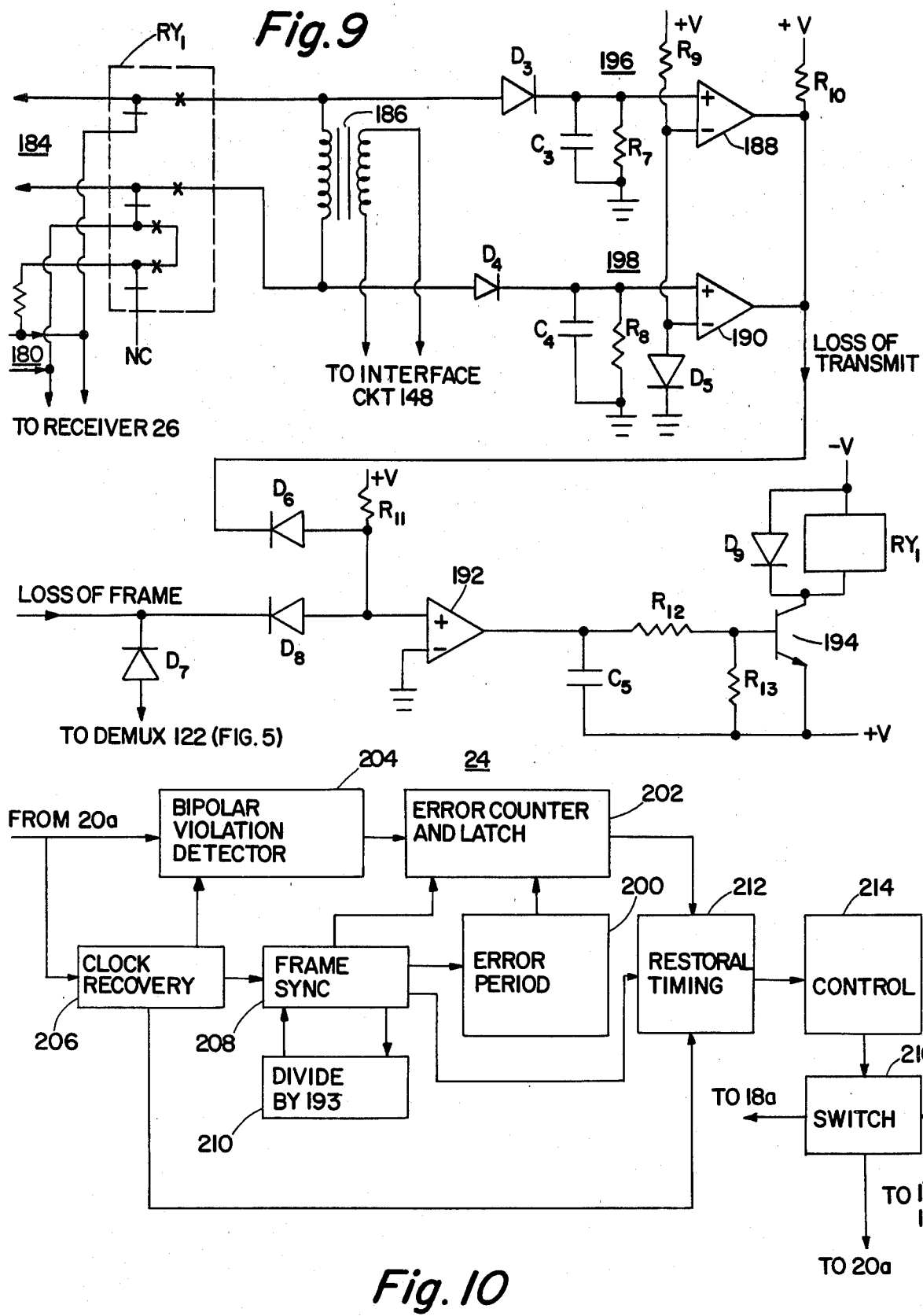

DIGITAL SUBSCRIBER CARRIER SYSTEM INCLUDING DROP TERMINALS AND BYPASS AND LOOPBACK MEANS AND ALARM INDICATION MEANS

DESCRIPTION OF THE PRIOR ART

In multi-channel PCM (pulse code modulation) communication systems, continuous time varying information signals, such as electrical speech signals, may be represented by a series of on and off pulses. At a transmitting station the signal for each channel is encoded into a time multiplexed PCM signal which is then transmitted over a medium such as a telephone transmission line to a receiving station. At the receiving station the PCM signals are decoded and reconverted back to continuous time varying information signals which are then sent to the respective channels.

The transmitting station may, for example, be located at a telephone central office and the receiving station may, for example, be located at a location remote from the central office adjacent to the location of the subscribers. The subscribers also transmit message signals to be received by the central office. The term central office (CO) terminal will therefore be used hereinafter to refer to the transmitter and receiver located at the central office end of the transmission line. The term subscriber terminal will be used to refer to the transmitter and receiver located at the furthest extension of the transmission line from the central office.

In commercially available multi-channel PCM systems all of the channels serve subscribers who are located at the subscriber terminal. There is no provision in such systems to drop off the messages contained in one or more channels and in turn insert return messages in these channels at a point intermediate the CO terminal and the subscriber terminal. It is, however, advantageous to allow one or more channels to be "dropped" and "inserted" at one or more such intermediate points. By allowing such "dropping" and "inserting", system flexibility is increased in that subscribers intermediate the CO terminal and the subscriber terminal may be served by the system. System reliability may also be increased as service to the intermediate subscribers may be maintained upon the occurrence of a fault condition which results in the loss of service to the subscriber terminal. The points intermediate the central office and the subscriber terminal where one or more channels are dropped and inserted will be referred to hereinafter as the drop terminals.

In conventional multi-channel PCM systems a failure of transmission or fault at any point in the closed loop between the central office and the subscriber terminal results in the interruption of service for the entire system. Such an interruption of service for the entire system would also occur in those systems which include drop terminals. It has, however, been recognized that in such systems the fault may be isolated by circumventing in some fashion that portion of the system which contains the fault. When the fault occurs at either the subscriber terminal or the drop terminal its circumvention will be referred to hereinafter as bypassing and the associated circuit which accomplishes this function will be referred to as the bypass circuit. When the fault occurs on the transmission medium at some point intermediate the central office and the subscriber or drop terminal its circumvention will be referred to hereinafter as loopingback and the associated circuit which accomplishes this function will be referred to as the loopback circuit. By circumventing the fault, service may still be maintained between the central office and those subscribers which are on the CO side of the fault.

There have been various attempts in the prior art to provide multichannel PCM systems which have both drop and insert channels and fault isolation. Such systems are described in U.S. Pat. Nos. 3,458,661; 3,519,935 and 4,002,847. The systems described in the '661 and '935 patents are both serial looped carrier systems wherein a central office is linked to a number of serially connected remote terminals. The remote terminals are all connected in the leg of the loop which is connected to the output of the central office and are said to allow for the dropping and inserting of channels in the same or different time slots. The circuitry by which this dropping and inserting is accomplished is not shown or described.

The system of the '661 patent allows for loopback of the remote terminals by providing for failure sensing apparatus and command circuitry located at the central office. The system of the '935 patent allows for loopback by providing circuitry which is locally located at the remote terminals. As the remote terminals are located on the outward line from the central office the local loopback circuitry is substantially more complex than if the remote (drop) terminals were all located on the line incoming to the central office. The terms "incoming" and "outgoing" are defined with respect to the central office.

The '847 patent describes a serial looped transmission system wherein both loopback circuits and a spare transmission line are included. Circuitry located in the central office controls switching to the spare line upon the detection of a fault on the main line. Upon the detection of a fault on the spare line or in response to a manual signal all of the remote terminals are loopbacked. A testing sequence is then initiated from the central office to thereby test all the remote links in sequence to identify the faulty links.

It was then recognized that it was desirable to provide for a digital subscriber carrier system which included drop terminals at points intermediate the central office and the subscriber terminal. It was further recognized that if these terminals were on the incoming cable pair then not only could these terminals be bypassed in the event certain fault conditions occurred but a simplified and automatic circuit located at each drop terminal could provide a loopback function upon the occurrence of a predetermined number of fault conditions. It was further recognized that such a system could provide a simplified alarm mechanism to allow a single serviceman to pinpoint the general location of a fault condition without the necessity of being in contact with the central office. Until the present inventions no such technique or circuitry was known which would produce these results.

The digital subscriber carrier system of the present inventions provides for drop terminals to be located at points between the central office and the subscriber terminal. The drop and subscriber terminals are identical in structure and serve one or more of the system's subscribers connected thereto. When the drop terminals are connected to the central office on the incoming cable pair simplified and automatically operating circuitry may be provided at each drop terminal for effecting a loopback upon the occurrence of a predetermined number of cable fault conditions. In this manner service may, depending on the location of the cable fault, be maintained to some of the subscribers. The loopback circuit functions automatically to remove the loopback upon correction of the fault condition. Also included at each of the remote terminals is circuitry for bypassing that terminal upon the occurrence of a predetermined number of terminal fault conditions. The system also includes an alarm mechanism which provides both at the central office and at each of the terminals a visual indication of the occurrence of an alarm and the place where the condition causing the alarm arose. The alarm mechanism consists of using various ones of the bits contained in the digital signal on the cable pairs to transmit the occurrence of an alarm to either the central office or terminal. By using the visual indications of an alarm a serviceman may simply and easily locate the fault condition.

SUMMARY OF THE INVENTION

In accordance with the present invention there is provided a drop terminal for a digital subscriber carrier system for serving at least one subscriber of the system. The central office transmits with a predetermined clock frequency a digital signal including messages for those subscribers served by the drop terminal. The drop terminal includes a receiver section for recovering the clock frequency from the received signal and means for identifying the messages for the subscribers served by the terminal and decoding those messages. The drop terminal also includes a transmitter section which responds to the recovered clock signal for inserting messages from the subscribers in those parts of the received signal identified by the receiver section as belonging to the subscriber.

There is also provided circuitry at each terminal for bypassing that terminal upon the occurrence of a predetermined number of terminal fault conditions. Upon the occurrence of one of the fault conditions a switch is operated to connect the signal coming into the terminal to the inward cable pair at a point adjacent to the terminals output. The operation of the switch disconnects the terminal output from the inward cable pair.

There is also provided circuitry adjacent each drop terminal which operates upon the occurrence of one or more cable fault conditions to disconnect the input of the terminal from the inward cable pair and connect it to the outward cable pair. As a cable fault condition results in an error appearing in the signal at the terminal input the circuit remains connected to the inward pair to detect absence of the error. Upon such detection the circuit operates to reconnect the terminal input to the inward cable pair.

There is also provided alarm circuitry at each remote terminal and at the central office for providing a visual indication of an alarm condition. A predetermined bit in a predetermined frame of the message signal is transmitted from the central office with a predetermined polarity. If the bit is received at the central office for one or more groups into which the subscribers are divided with the same polarity as it was transmitted an alarm is indicated at the central office. The central office transmitts the alarm indication to the corresponding remote terminal. Each terminal and the central office also includes circuitry for indicating an alarm condition upon the occurrence of one or more of a predetermined number of errors in the signal received at either the terminal or the office.

DESCRIPTION OF THE DRAWING

FIG. 9 is a schematic diagram showing the circuitry included in the bypass circuits of FIGS. 1 and 8.

FIG. 10 is a block diagram showing the circuitry included in the loopback circuit of FIGS. 1 and 8.

Referring to FIG. 1 there is shown a multichannel pulse code modulation subscriber carrier system 10 constructed in accordance with the present invention for transmitting signals between a central office 12 and a multiplicity of subscribers some of whom are served by subscriber terminal 14 and with the remainder being served by drop terminal 16. The system shown in FIG. 1 is designed to serve N total subscribers from the central office to which they are connected. Each subscriber has an assigned channel over which message signals in the form of binary encoded information are transmitted and received from the central office. Where system 10 is used to provide service to telephone subscribers the message signals will typically consist of speech samples and signalling information. Where system 10 is used to provide service to other types of subscribers the message signals will consist of various other forms of binary encoded information such as data. System 10 may therefore also be referred to as an N channel system. The channels are time multiplexed with respect to each other. The number of bits into which a speech sampled is encoded and the total number of bits transmitted by the system are dependent upon the system type.

Figure 1:
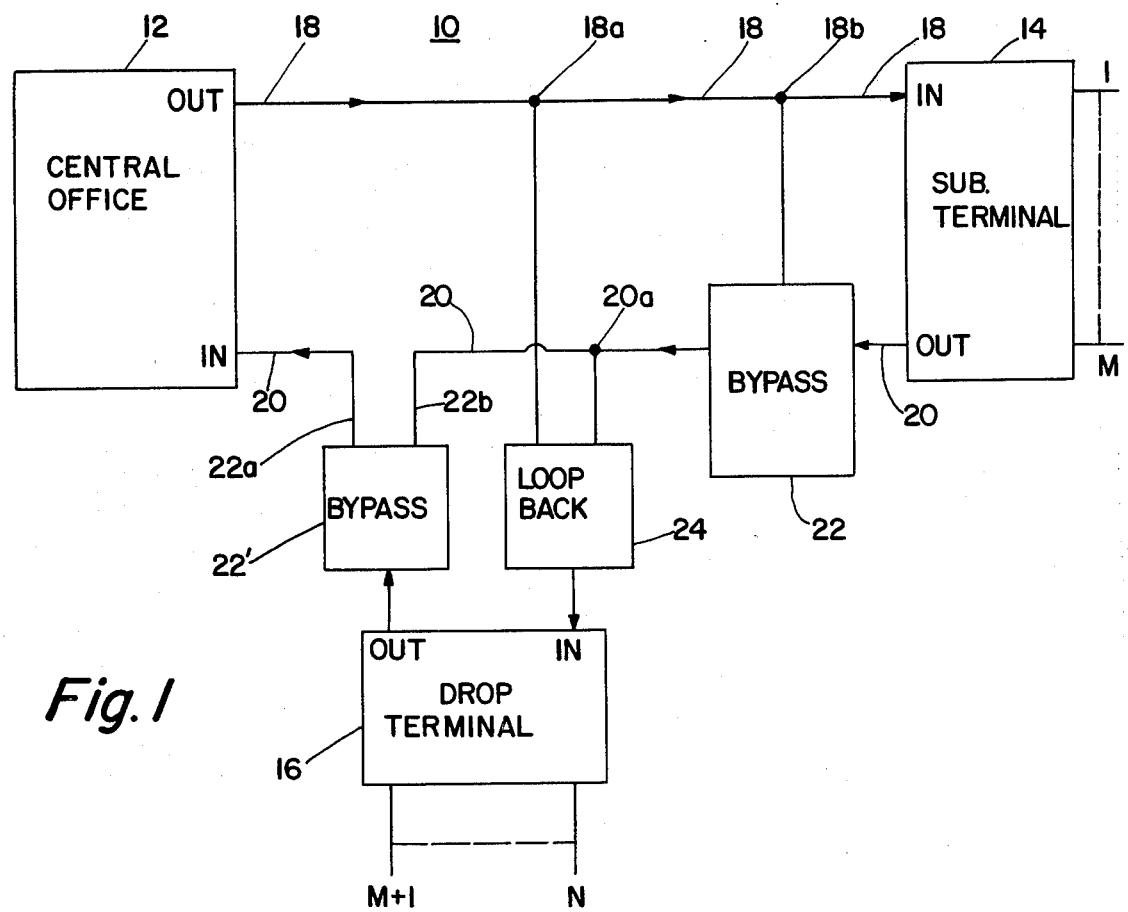
FIG. 1 is a schematic block diagram of a digital subscriber carrier system in accordance with the present invention.

Signals to be transmitted to the N subscribers from the central office leave the office by outgoing transmission pair 18. These signals arrive at subscriber terminal 14 wherein M of the N total subscribers are located. Terminal 14 is located at the furthest extension of outgoing pair 18 from central office 12. As will be described in more detail hereinafter terminal 14 comprises a transmitter section, a receiver section and circuitry for interfacing with the M subscriber whose telephones are connected thereto. The receiving sections allow messages from the central office for any or all of the M subscribers served by terminal 14 to be decoded and sent to their respective telephones. The transmitting section allows return messages for the central office from any or all of the subscribers served by terminal 14 to be encoded and placed into the time location or slot corresponding to the particular subscriber. Messages for those subscribers not served by terminal 14 are uneffected by the terminal in that these messages leave the terminal in exactly the same time slots in which they arrived.

The balance of the subscribers (N-M) are located at drop terminal 16. The drop terminal is located on incoming transmission pair 20 at a point intermediate central office 12 and subscriber terminal 14. Terminal 16 is similar to the subscriber terminal in that it also comprises a receiver section, a transmitter section and interfacing circuitry. Messages for the drop terminal subscribers are then transmitted from the central office over outgoing pair 18 to subscriber terminal 14 and then over incoming pair 20 to the terminal 16. The N channel time multiplexed PCM signal received at terminal 16 therefore comprises the combination of the messages generated by the subscribers at terminal 14 for transmission to the central office plus the messages transmitted from the central office for the M+1 to N subscribers located at terminal 16. The N channel signal from terminal 14 is transmitted to terminal 16 and central office 12 by incoming transmission pair 20.

At drop terminal 16 any messages for the subscribers at that location are decoded from the signal received from terminal 14. Messages for the central office from the subscribers at terminal 16 are encoded and placed in the time slot corresponding to the particular subscriber. The time slots corresponding to the subscribers connected to terminals 14 and any messages contained therein are unaffected by terminal 16. Thus, terminal 16 functions in a manner similar to terminal 14 with respect to the subscribers connected to that terminal.

The time multiplexed PCM signal is then transmitted to the central office over that portion of incoming line 20 which connects terminal 16 and central office 12. The signal received by the central office is identical in format to that transmitted by the office with the exception that the messages for the central office have been placed in the time slots corresponding to the subscribers connected to terminals 14 and 16. The central office decodes these messages and routes them to the intended recipient which may, for example, be another subscriber of the N channel system 10 or a subscriber who is not one of the subscribers included in system 10.

In the event that a fault condition occurs in the subscriber terminal it would be advantageous to continue to provide service to the subscribers connected to terminal 16. A fault condition may result either from a loss of power at the terminal or a problem associated with the receiver or transmitter circuitry. This continuation of service to the subscribers connected to terminal 16 is accomplished by the action of bypass circuit 22. As will be described in more detail hereinafter upon occurrence of a fault in terminal 14, bypass circuit 22 causes the time multiplexed signal on outgoing line 18 to be routed directly to incoming line 20 thereby bypassing terminal 14. Circuit 22 accomplishes the bypassing of terminal 14 by in effect connecting incoming transmission pair 20 to outgoing transmission pair 18 at the point designated as 18b in FIG. 1. The above connection results in the breaking of the connection between the transmitter section of terminal 14 and incoming line 20. The bypass circuit is part of the circuitry included in terminal 14, but has been shown exterior to the terminal for purposes of description. Until the cause of the fault can be ascertained and correction effected the M subscribers connected to terminal 14 are without telephone service but service is still maintained to the subscribers connected to terminal 16. For reasons to be described in more detail hereinafter even when terminal 14 is bypassed by the operation of circuit 22 the receiver section of the terminal is still connected to outgoing line 18 to receive the time multiplexed signal contained thereon. Thus, circuit 22 operates to bypass terminal 14 upon the occurrence of a fault condition in the terminal.

In the event that one of the terminal fault conditions described above should occur in drop terminal 16 it would be advantageous to maintain service to the subscribers connected to terminal 14. In order that this end may be accomplished terminal 16 has associated with it a bypass circuit 22' whose structure and function is identical to that described above for circuit 22. Upon the occurrence of a fault condition in terminal 16, circuit 22' functions to bypass the terminal by connecting that portion of incoming line 20 connected between the output of terminal 14 and the output terminal 16 to that portion of line 20 which would ordinarily connect the output of terminal 16 to central office 12. Even when terminal 16 is bypassed by the operation of circuit 22' the receiver section of the terminal is still connected to line 20 to receive the output from terminal 14.

If a fault condition should occur either on cable pair 18 or 20 at a point between drop terminal 16 and subscriber terminal 14 it would be advantageous to maintain service to those subscribers connected to terminal 16 while correction is effected. Service to the subscribers of terminal 16 upon the occurrence of a cable pair fault is maintained through the operation of loopback-circuit 24. A detailed diagram of circuit 24 is shown in FIG. 10 to be described hereinafter. A cable pair fault may arise for example by the inadvertent cutting of either cable pair 18 and/or 20. Cable pair faults may also arise from the failure of a system repeater to provide signal regeneration. System 10 usually includes one or more repeaters (not shown) with the repeater spacing being determined as a function of the guage of the cable used for pairs 18 and 20. Ordinarily, drop terminal 16 would be connected to pairs 18 and 20 at or near a repeater location as the repeater provides functions such as line buildout for the terminal. If terminal 14 is sufficiently distant from terminal 16 then one or more repeaters also will be included on pairs 18 and 20 between terminals 14 and 16.

A cable fault condition, no matter what its source will cause an error to appear in the signal on either pair 18 and/or 20. Upon detection of this error, circuit 24 will cause the input of terminal 16 to be connected to outgoing cable pair 18 at the point designated as 18a in FIG. 1. In the absence of a cable pair fault condition the input to terminal 16 is connected to cable pair 20 at the point designated as 20a. By so connecting the input of terminal 16 to cable pair 18 upon the occurrence of a cable fault condition circuit 24 has looped back the system at that point. If the cable fault lies between terminals 14 and 16 then upon loopbacking the input to terminal 16 will be connected to cable pair 18 at a point where service may be continued to those subscribers connected to the terminal.

As subscriber terminal 14 is located at the furthest extension of the system a loopback circuit is not needed for that terminal. As will be described in more detail in connection with the circuits of FIGS. 9 and 10 bypass circuit 22' and loopback circuit 24 interact in that certain ones of the fault conditions which result in the operation of the bypass circuit also result in the operation of the loopback circuit.

Before proceeding to a detailed description of the drop and insert function associated with terminals 14 and 16 and the bypass and loopback functions associated with circuits 22 and 24, the data transmission format of a typical multichannel time multiplexed PCM system will be described.

Figure 2:
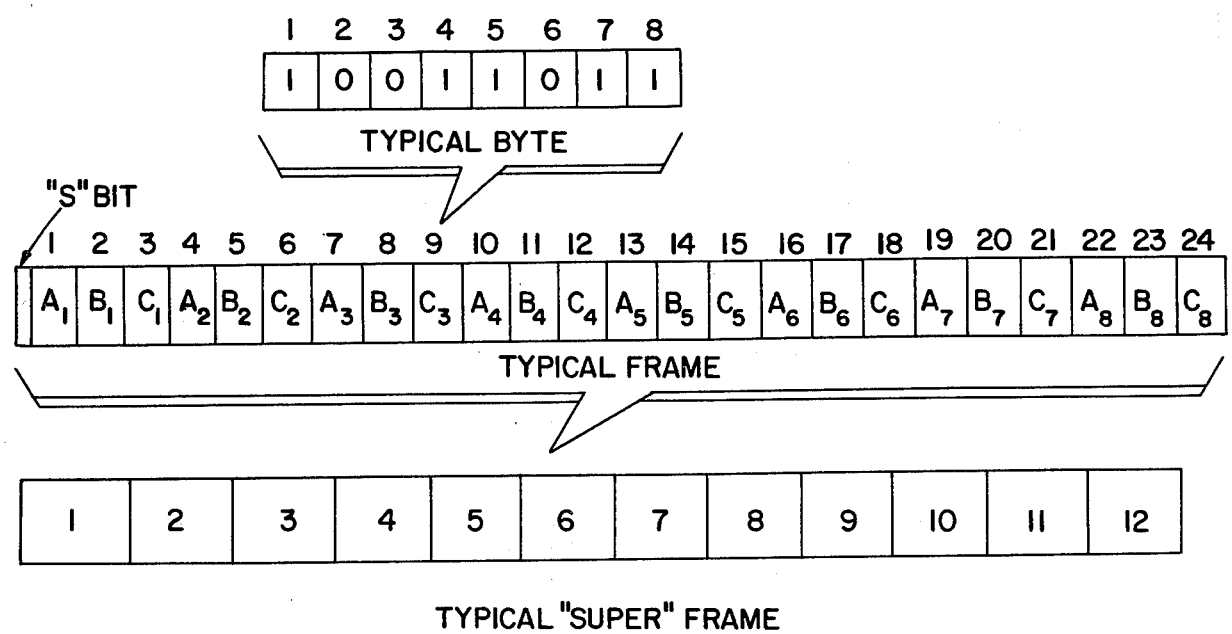
FIG. 2 shows the data transmission format used in the system shown in FIG. 1.

Referring to FIG. 2 there is shown the data transmission format associated with a 24 channel time multiplexed system constructed in accordance with the present invention. The subscriber carrier system described herein follows the format of D3 type trunk carrier system where that format applies to subscriber carrier. In a PCM system the signals associated with each subscriber may represent voice frequency transmissions or other types of useful data such as dialing, on-hook/off-hook, ringing, etc. information. In the central office the analog signals for each subscriber are sampled, compressed and converted into a binary format. The term "D3" indicates that the samples for each subscriber are first compressed according to a MU255 characteristic and then converted into a binary format which uses eight (8) bits to represent the sample amplitude and polarity. The eight bits are often referred to as a "byte". The eight bit encoded message for each subscriber is then interleaved in time with the encoded messages for the other subscribers of the 24 channel system. The time multiplexed channels are then combined with a single bit which is referred to as an "S" bit. The combination of the S bit and the 192 bits (8 bits per channel times 24 channels) forms a frame. The S bit is varied from frame to frame to form a specific repetitious pattern and is used at terminals 14 and 16 for the purposes of synchronization.

The frames themselves are then interleaved in time to form a group of 12 frames which is often referred to as a "super" frame. The time required to transmit a single byte is approximately 5.2 micro seconds. The time for one bit is approximately 0.65 micro-seconds which allows for $1.544 \times 10^6$ bits to be transmitted per second. In combination with the "S" bit the time for transmitting a single frame is 125 micro-sec. The time for transmitting a super frame is therefore 1.5 m sec. The time for each bit is generated by an oscillator located in the central office. The oscillator provides a signal (hereinafter referred to as a "clock") whose period is used to provide the bit timing. Each of terminals 14 and 16 extract the clock from the message signal received on cable pairs 18 and 20, respectively. The terminals use the clock as will be described hereinafter to provide timing in their receiver and transmitter section as well as the subscriber interface circuitry. Thus the oscillator located in the central office provides the master clock and each of the terminals are slaved thereto for purposes of timing.

In each frame, except as noted below for frames 6 and 12, the 8 bit byte for each channel carries encoded voice frequency signals. A typical byte is shown in FIG. 2. For frames 6 and 12 the byte for each channel not only carries encoded voice frequency signals but also carries for frame 6 information from the subscriber to the central office relating to on-hook/off-hook status of the subscribers phone and for frame 12 information from the central office to the subscriber relating to the ringing of the subscribers phone. In frames 6 and 12 the additional information contained therein is carried within the 8 bit byte associated with each channel. For these frames only seven bits are used to transmit voice frequency information. The signalling information is contained in the least significant bit of the byte associated with each channel. In frame 6 the least significant bit of each byte is a "one" if the associated subscribers phone is off-hook and a "zero" if it is on-hook. In frame 12 the least significant bit of each byte is a "one" if the associated subscriber's phone is not ringing and a "zero" if it is ringing. Reducing the voice information in frames 6 and 12 to 7 bits results in no significant degradation in voice frequency performance of system 10.

As shown in FIG. 1 some of the subscribers may be located at the remote or far end of the system at subscriber terminal 14. Others of the subscribers may be located at a point intermediate the central office and the far end at drop terminal 16. For simplicity of description the dropping and inserting, bypassing and loopback of the present invention will be described in connection with a 24-channel time multiplexed PCM system utilizing the format shown in FIG. 2, wherein 16 subscribers (channels) are located at subscriber terminal 14 and 8 subscribers are located at the drop terminal 16. It should, however, be appreciated that the present invention may be used with any multichannel time multiplexed PCM type system involving any combination of subscriber and drop terminals including those wherein a single subscriber is located at a given terminal.

Figure 3:
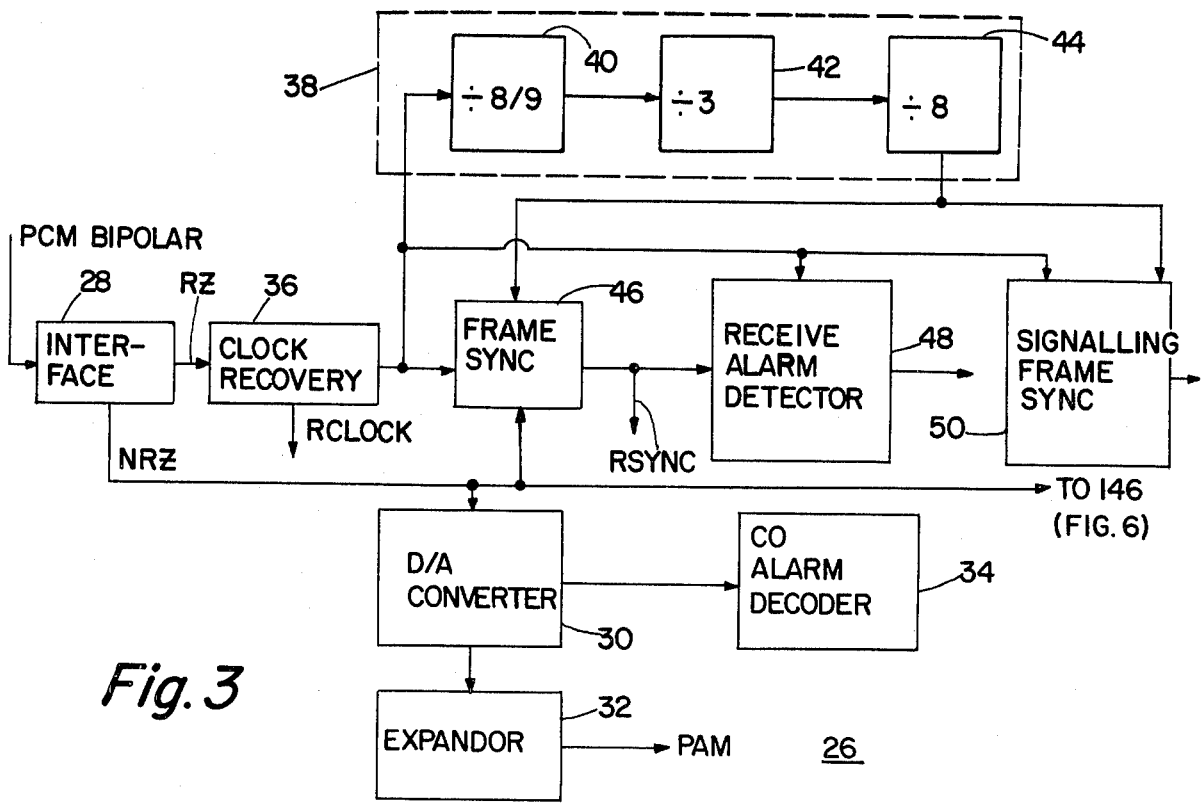
FIG. 3 is a block diagram of the receiver section of each of the remote terminals shown in FIG. 1.

Referring to FIG. 3 there is shown a block diagram of the receiver portion 26 of either subscriber terminal 14 or drop terminal 16. The incoming signal to either terminal 14 or 16 on pair 18 or 20 is a 24 channel time multiplexed PCM signal with the format shown in FIG. 2. As will be described in more detail hereinafter the receiver portion of the terminal provides from the received PCM signal the necessary signals to the transmitter portion of the terminal to insure that messages from the terminal's subscribers to the central office are placed in the time slots which correspond exactly to those subscribers.

The PCM signals received from either pair 18 or 20 are bipolar in nature that is, successive bits which are ones alternate in polarity. Interface circuit 28 full wave rectifies the bipolar signal to provide a unipolar return to zero (RZ) signal to clock recovery circuit 36. Circuit 28 also provides a non return to zero (NRZ) signal to D/A converter 30 and frame sync circuit 46. The NRZ signal may be obtained from the RZ signal by use of a flip-flop. Interface circuit 28 may also include a transformer to provide isolation between the transmission pair 18 or 20 and the receive circuit 26.

D/A converter 30 converts the 8 bit PCM signal for each channel into a compressed pulse amplitude modulated (PAM) signal. It should be appreciated that the receiver section of terminals 14 and 16 D to A converts the entire received PCM signal independent of whether or not all of the 24 subscribers are connected to the terminal. The compressed PAM signal out of converter 30 is expanded by expandor 32. At the central office prior to transmission the PAM signals to be transmitted to each subscriber were compressed in accordance with a predetermined compression characteristic. For the T1D3 type system the compression characteristic follows the mu-255 law. Expandor 32 expands the compressed PAM by the use of an expansion characteristic which is the complement of the compression characteristic. Thus the signal out of expandor 32 is uncompressed PAM which is substantially identical (except for quantizing noise) to the uncoded uncompressed analog signal at the central office.

Converter 30 and expandor 32 may take any one of a number of forms. Converter 30 may for example be of the linear type. The linear converter converts the all zero byte to −1 V, the all ones byte to +1 V and the two bytes intermediate therebetween, namely 01111111, 10000000, to 0 V. In order that the linear converter may properly perform its conversion it is necessary that the received PCM be converted into the offset binary format before D/A conversion. The received PCM is in the $D_3$ format wherein the most significant bit (MSB) represents signal polarity and is a zero if the signal is negative and a one if it is positive. In the $D_3$ format the lower seven bits are all zeros at maximum negative and positive volts and are all ones at zero volts. Conversion of the received signal from the $D_3$ format to the offset format requires that the successive lower order bits of the received signal be inverted by a suitably arranged inverting circuit if the MSB is a one.

A suitable linear D/A converter may comprise the combination of an eight bit serial to parallel shift register, an eight bit latch and a chip type D/A converter. The PCM signal is received in serial fashion one bit following another in time. After conversion from D3 format to offset binary format the eight bits for each channel are placed in the shift register. The contents of the shift register are then placed in parallel in the eight bit latch where the byte is now available to the D/A converter chip for linear conversion to a compressed analog signal. The D/A converter chip may for example be the DAC08 type chip manufactured by either Advanced Micro Devices of Sunnyvale, CA or Precision Monolithics Incs. of Santa Clara, CA. The output of D/A converter 30 is a compressed PAM signal which is then expanded by expandor 32 which may be an instantaneous expandor of the type described in U.S. patent application Ser. No. 185,892 filed on Sept. 10, 1980, now U.S. Pat. No. 4,309,676 and entitled "Instantaneous Compressor and Instantaneous Expandor" which is assigned to the same assignee as is the present application.

The digital signal contained in the eight bit latch portion of D/A converter 30 is provided to CO alarm decoder circuit 34 to determine if the central office is receiving message signals from the subscribers connected to the terminal. In accordance with the D3 format, the central office indicates to the terminal that it is not receiving the subscribers connected to either terminal 14 or 16 by causing the bit adjacent to the MSB (bit two) to be a zero for all of the subscribers connected to the particular terminal. Whether a channel is not in use (idle) or even if a subscriber is talking on the channel, bit two will ordinarily be a one. In the D3 format bit two will be a zero only if the signal amplitude on the channel is at or near a positive or negative maximum. As maximum amplitude on a channel occurs infrequently then statistically bit two will ordinarily be a one.

Figure 13A:
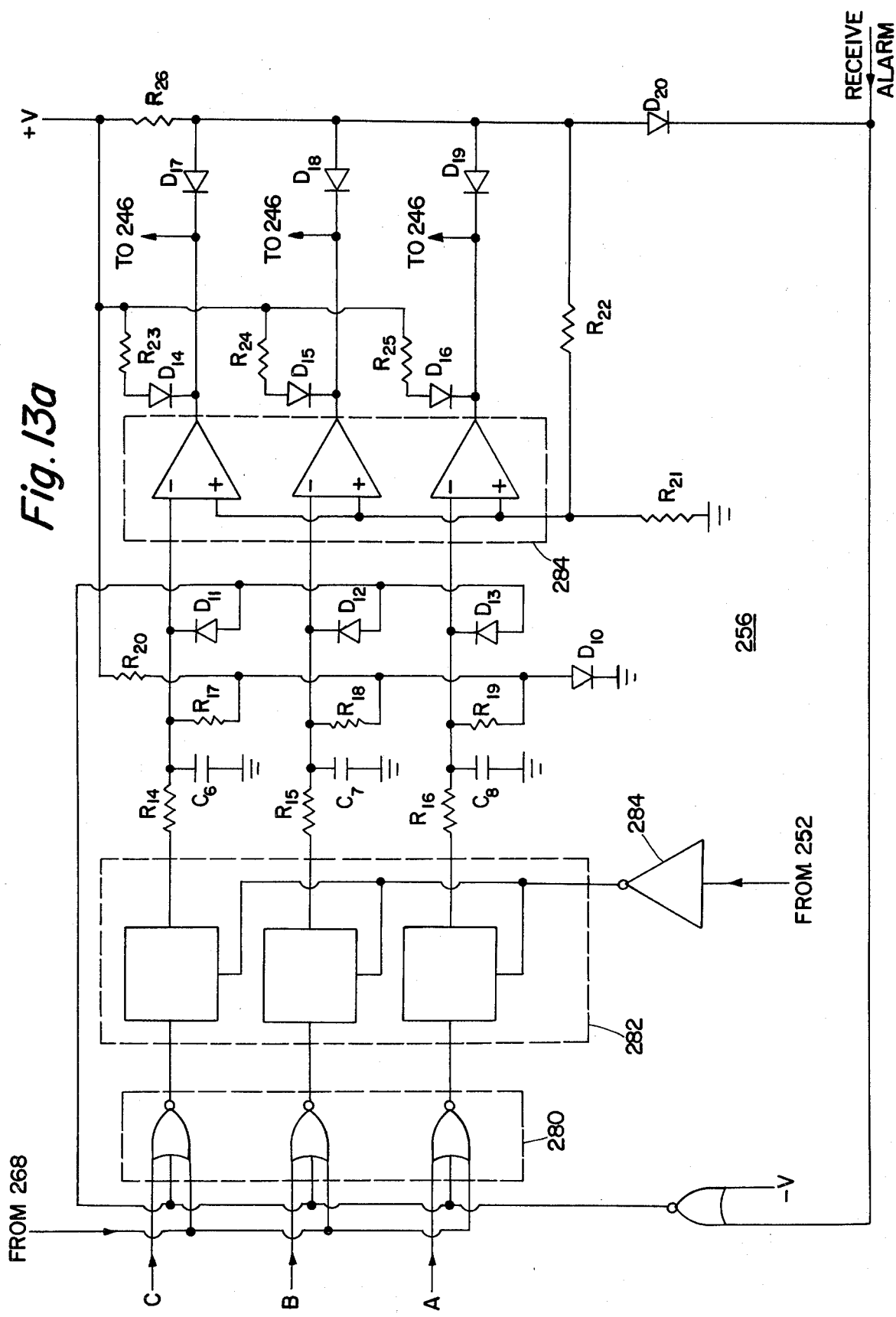
FIGS. 13a, b and c and d are schematic diagrams showing the alarm circuitry included in the central office receiver and transmitter sections and at each remote terminal.
Figure 13B:
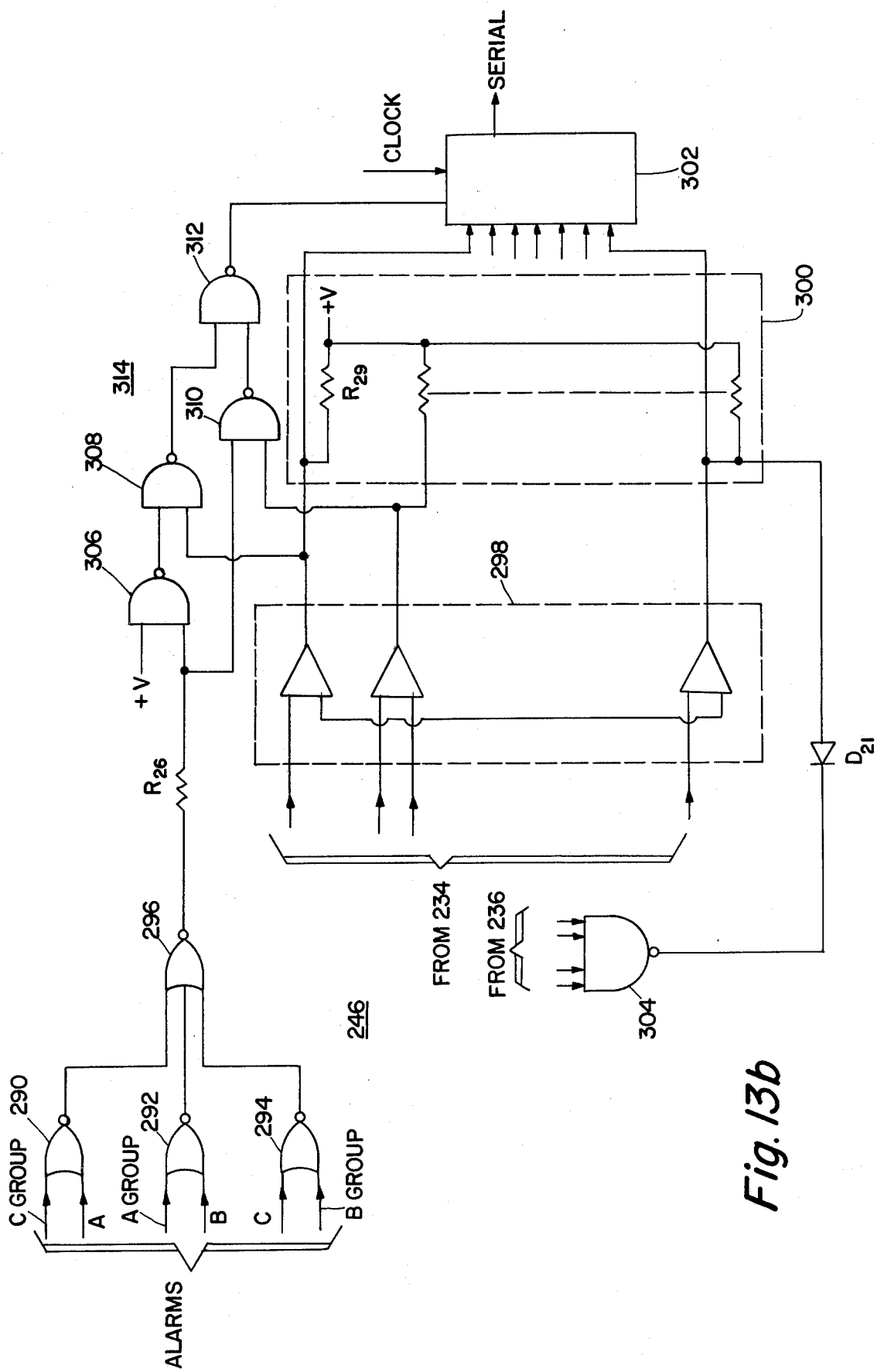
Figure 13C:
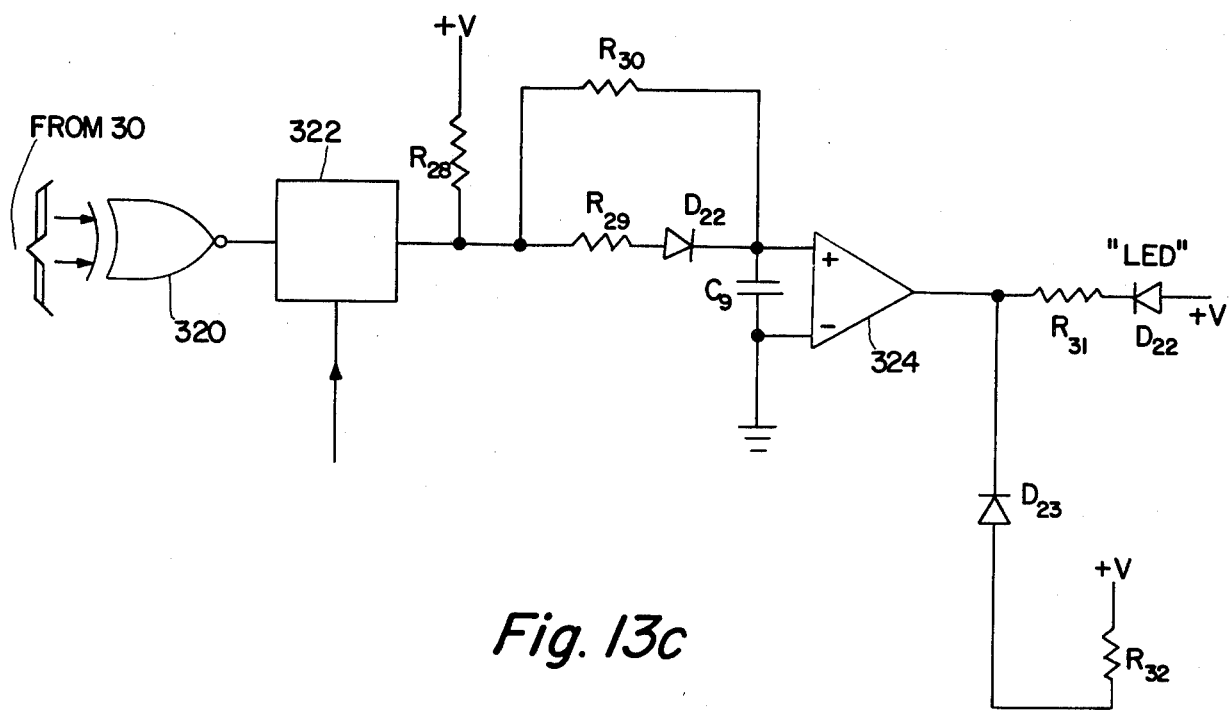

Alarm decoder 34 may comprise as shown in FIG. 13C to be described hereinafter the combination of logic gate, an R-C circuit and a LED. The logic gates are suitably arranged to decode those bit two's which are zeros. For those subscribers connected to the terminal whose bit two is a zero, the capacitor of the R-C circuit combination is allowed to discharge. For those subscribers connected to the terminal for whom bit two is a one, the capacitor is charged by the resistor from a supply. A diode is placed in the R-C circuit in a fashion so as to prevent the capacitor from charging at all other times.

Under normal circumstances with bit two ordinarily a one the capacitor will be kept sufficiently charged to prevent the LED from being lit. When the central office is no longer receiving messages from the subscribers at the terminal a sufficient number of zero bit two's will be received at the terminal to thereby use the capacitor to discharge sufficiently to allow the LED to be lit. The number of zero bit two's that must be received before the LED lights is dependent on the number of subscribers connected to the terminal. For example, with eight subscribers connected to the terminal approximately two frames of bit two being zero will light the LED. For lesser number of subscribers connected to the terminal the R-C time constant may be adjusted to prevent false indications. After an alarm is indicated the receiving of bit two as a one for approximately eight successive channels will turn off the LED.

Clock recovery circuit 36 also receives the RZ unipolar signal generated by interface circuit 28. Circuit 36 recovers the 1.544 MHz clock signal used to transmit the PCM signal from the central office to terminal 14 or 16. Circuit 36 may for example comprise the combination of a high Q tuned circuit which rings at 1.544 MHz and a zero crossing detector. The tuned circuit is comprised of the parallel combination of an inductor and a capacitor whose temperature coefficients are matched to maintain the circuit tuned to 1.544 MHz over the temperature range usually encountered in the terminal. A resistor is arranged in parallel with the inductor and capacitor to provide control for the value of Q.

The tuned circuit rings at the clock frequency with an amplitude which is dependent on the density of ones contained in the incoming bit stream. The first received one will start the tuned circuit ringing. Subsequent received ones will increase the amplitude of the ringing but not change the zero crossing of the signal generated by the circuit. The zero crossing detector responds to the zero crossings of the ringing signal to thereby generate a square wave of fixed amplitude at the clock frequency. Thus circuit 36 recovers from the incoming PCM signal a constant amplitude signal which is identical in frequency with the signal used at the central office to clock the bits onto the transmission line.

The clock signal recovered by circuit 36 is provided to divider circuit 38 which operates as will be described hereinafter to perform a multiplicity of divisions on the signal to thereby provide signals for use by frame synchronization circuit 46 in determining which one of the incoming bits is the "S" bit. The recovered clock signal is first divided by 8/9 divider 40 into 23 groups of eight bit times each which are then followed by one group of nine bit times. The group of nine bit times includes the bit time associated with the "S" bit. Thus circuit 38 breaks the recovered clock signal into the format of the 24 channel PCM signal transmitted to the terminal from the central office.

Dividers 42 and 44 divide the signal generated by divider 40 by three and eight, respectively, to provide an overall division by 24 to thereby define the period of time or time slot associated with each channel of the 24 channel system.

In the 24 channel system described herein the channels are grouped together in groups of eight channels each. Each 8 channel group is given a letter designation such as A, B, or C. The eight channels in each group are then distinguished from each other by adding onto the letter designation a number designation which ranges from 1 to 8, inclusive. Thus the 8 channels in the A group of channels are designated A1, A2 ... A8, with similar designations for the eight channels comprising the B and C groups. The 24 channels are transmitted from the central office in the sequence A1, B1, C1, A2, B2 ... B8, C8 as shown in FIG. 2. Thus, channel 1 corresponds to the first channel of the A group, channel 2 corresponds to the first channel of the B group, channel 3 corresponds to the first channel of the C group and so on.

For the system being described herein it has been assumed that 16 of the 24 channels are located at the subscriber terminal 14 and the remaining 8 channels are located at the drop terminal 16. Thus the B and the C group of channels may be located at terminal 14 and the A group of channels may be located at terminal 16.

Divide by three circuit 42 therefore functions in a manner to break the 24 channel bit time signal generated by divider 40 into the time corresponding to three groups of 8 channels each. These three groups follow the A, B and C channel grouping described above.

Divide by eight circuit 44 then breaks the group time signal into eight parts in order to define the time slot associated with each of the channels in each eight channel group. Therefore, circuit 42 defines the time slot associated with a group of channels and circuit 44 defines the time slot for the individual channels in each group. Thus divider circuit 38 provides from the recovered clock signal an output signal which defines the bit times for the bits in the frame including the "S" bit and in addition defines for any group of 8 bit times a particular channel and the group of 8 channels to which it belongs. In effect divider circuit 38 has divided the recovered clock signal by 193. It should be appreciated that divider circuit 38 has divided the recovered clock signal into three groups of eight channels each and has arbitrarily designated a particular channel as being associated with a particular group. Circuit 38 has also arbitrarily designated one received bit time as being the "S" bit. Typical circuits for each of divider circuits 40, 42 and 44 are shown in FIG. 4a to be described in connection with FIG. 4b hereinafter.

The output signal from divider circuit 38 is used by frame synchronization circuit 46 in conjunction with the signals generated by circuits 28 and 36 in order to determine from the received PCM signal which one of the bits is the "S" bit. Determination of the "S" bit allows receiver 26 to synchronize with the received PCM signal such that the period of time which has been arbitrarily defined by circuit 38 as a particular channel will correspond exactly with the received channel. Thus when synchronization is achieved the time period identified as channel A1 by circuit 38 will correspond exactly with received channel one.

The "S" bit follows a predetermined pattern in the odd frames of the received PCM signal. Circuit 46 first operates in a search mode to look at the received bit which falls in the time arbitrarily designated by circuit 38 as corresponding to the "S" bit time for the first odd frame to determine if this is the correct bit. There is only one chance in 386 that the initial bit arbitrarily designated as the "S" bit will be that bit. Circuit 46 then looks at the bit designated as the "S" bit in the next odd received frame to determine if the selected bit follows the predetermined pattern. For odd frames the "S" bit alternates in polarity. If the pattern is not followed then the selected bit is not the "S" bit and circuit 46 in conjunction with circuit 38 designates the next adjacent bit position as corresponding to the actual or true "S" bit. This procedure of designating a new bit position as the "S" bit is continued until circuit 46 locates a bit which appears to be the true "S" bit. Due to the randomness of the received data pattern circuit 46 may detect a bit which follows the predetermined pattern and thus appears to be the "S" bit. The sync circuit is kept enabled in its search mode until such time elapses as insures that the "S" bit has been found. When the above time elapses the circuit switches to its normal mode of operation. In this mode of operation the circuit monitors the received "S" bit to determine if synchronization is being maintained. Loss of synchronization will result in the circuit switching to its search mode of operation once again. A preferred circuit embodiment for sync circuit 46 is shown in FIG. 4b which will be described in connection with FIG. 4a.

Figure 4A:
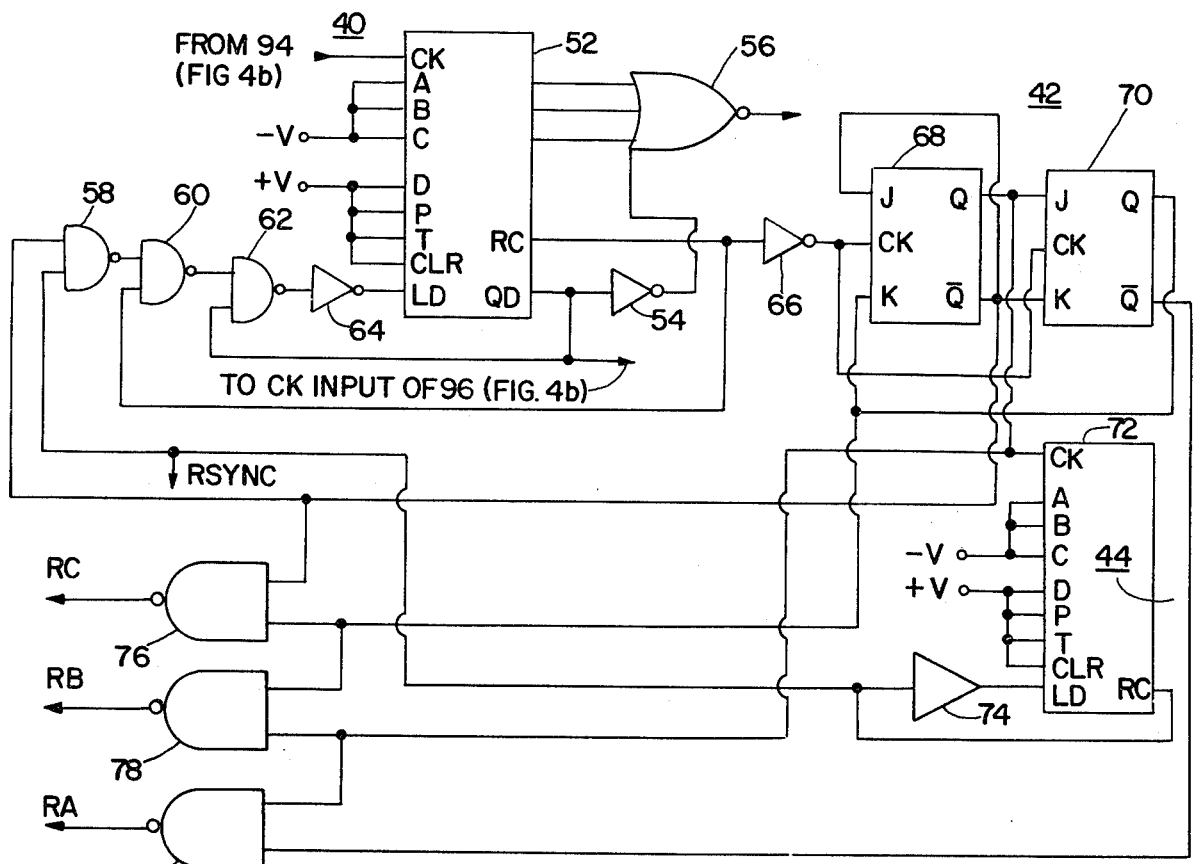
FIGS. 4a and 4b are schematic diagrams showing circuits for various ones of the blocks shown in FIG. 4.
Figure 4B:
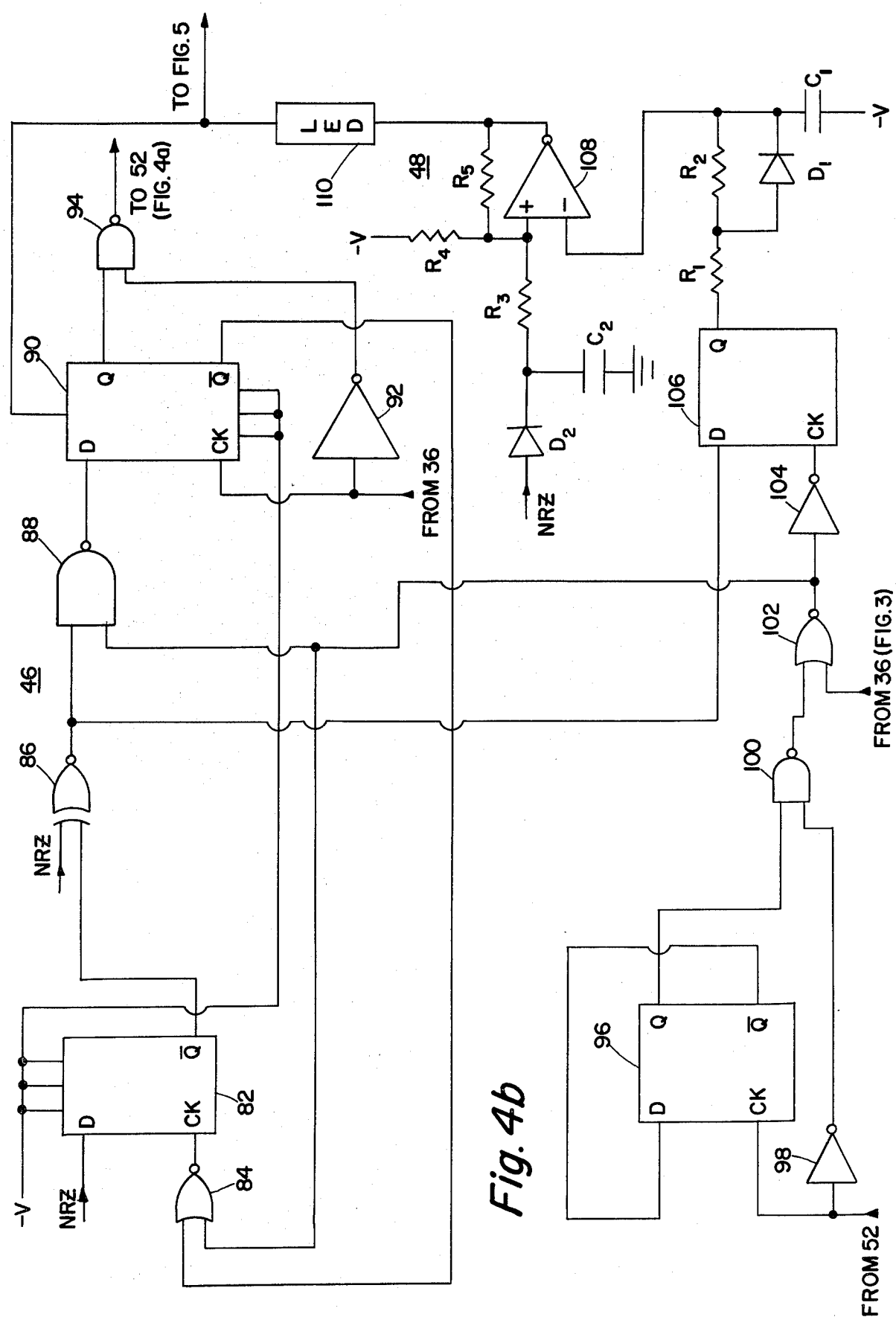

Referring to FIG. 4a there are shown typical embodiments for dividers 40, 42 and 44 of circuit 38. Divider 40 comprises programmable counter 52 and associated logic elements OR gate 56, AND gates 58, 60 and 62 and inverters 54 and 64. Counter 52 is a four bit counter which is capable of counting from 0 to 15. Prewiring the A, B, C and D inputs to counter 52 will result in the counter starting its counting at a predetermined non-zero count. The appearance of a low level signal at the counters LD input results in the prewired count being entered into the counter at the next positive clock pulse. The clock pulses appear at the counters CK input and are generated by the frame sync circuit 46 from the recovered clock signal as shown in FIG. 4b. For the counter wired as shown in FIG. 4a the predetermined count is 8. Thus counter 52 will count 8 clock pulses starting at the entry of the predetermined count and ending at the count of 15.

AND gates 58, 60 and 62 aid in loading the prewired count into the counter under various conditions. The operation of these gates will be described hereinafter.

Upon reaching the count of 15, counter 52 generates a ripple carry signal at its RC output. The ripple carry signal is provided to one input of AND gate 60 and by inverter 66 to the clock (CK) inputs of the flip-flops (F/F) 68 and 70 which comprise divide by three circuit 42. F/F's 68 and 70 are interconnected in a manner so as to form a Johnson counter. More particularly, F/F 68 has its Q or set output and its $\overline{Q}$ or reset output connected to the J and K inputs, respectively, of F/F 70. The $\overline{Q}$ output of F/F 68 is also connected to the F/F's J input. The Q output of F/F 70 is connected to the K input of F/F 68.

The Q output of F/F 68 is also connected to the CK (clock) input of counter 72 which in combination with driver 74 comprises divide by eight circuit 44. Counter 72 is also a programmable four bit counter which is identical to counter 52. With the inputs to counter 72 wired as shown in FIG. 4a, an initial count of 8 is formed into the counter at the next clock pulse following the appearance of a low level signal at the counter's LD input. The low level signal appears at the LD input when the counter generates a ripple carry signal upon reaching the count of 15. Thus counter 72 counts from an initial count of 8 to a final count of 15 or eight counts.

Divide circuit 42 defines the time associated with the particular group of eight to which the channel belongs whereas divide circuit 44 defines the position of the channel in that group. As will be described in more detail counter 72 is clocked one count each time circuit 42 cycles through three counts. Thus circuit 42 defines in time whether the channel is in the A, B or C group and counter 72 defines whether it is the first, second, third and so on up to the eighth channel in that group.

AND gates 76, 78 and 80 function in a manner to be described hereinafter to generate signals indicating that the times associated with the A, B and C groups of channels are being designated.

The operation of counters 52 and 72 and F/F's 68 and 70 and the associated digital circuitry of FIG. 4a will now be described in detail. Assume for the purposes of description that circuit 38 is about to identify the eight bit times which are arbitrarily designated as being associated with received channel one. Under these circumstances the pre-wired count of 8 has just been loaded into the counter 52 upon the appearance of the next recovered clock pulse at the CK input of the counter. Upon the loading of the pre-wired count into counter 52 the RC output of the counter goes low thereby providing by inverter 66 a positive going pulse at the CK inputs of flip-flops 68 and 70. Assuming that both flip-flops were initially reset the appearance of the positive-going pulse at the CK inputs of the flip-flops causes flip-flop 68 to set. Flip-flop 68 remains reset. When flip-flop 68 goes set its Q output goes high thereby placing a positive-going signal on the CK input of counter 72. Assume further that a low level signal is appearing at the LD input of counter 72. The appearance of the positive-going signal at the counters CK input results in the prewired count of eight being loaded into the counter. AND gate 80 which has one input connected to the set output of flip-flop 68 and the other input connected to the reset output of flip-flop 70 generates a signal designated as RA which indicates that the time for a channel belonging to the A group of channels is being defined. Counter 52 counts 7 additional recovered clock pulses and reaches a count of 15. Counter 52 has therefore counted the eight bit times which are arbitrarily be designated as corresponding to received channel one. Thus, during the time counter 52 is counting the eight bit times arbitrarily designated as being associated with channel one circuits 42 and 44 indicate this designation.

Upon reaching the count of 15, counter 52 generates a signal out of its ripple carry output which by the operation of AND gate 60 places a low level signal at the LD input to the counter. At the appearance of the next recovered clock pulse at the CK input to counter 52 the prewired count of eight is once again placed into the counter. Counter 52's ripple carry signal goes low which provides a positive signal to the CK inputs of flip-flops 68 and 70. As a result of this signal, flip-flop 70 is clocked set. Flip-flop 68 is unaffected by the signal and remains set. The Q output of F/F 68 has not changed in level. There is therefore no change in the signal level into the clock input of counter 72 and the counter remains fixed at the count it had previously. AND gate 78 having one input connected to set output of F/F 68 and the other input connected to the set output of F/F 70 generates a signal designated as RB which indicates that a channel belonging to the B group of channels is being defined.

At the generation of the next ripple carry signal from counter 52, F/F 68 will be clocked reset and F/F 70 will be unaffected and remain set. The Q output of F/F 68 will change from a high level to a low level. Counter 72 will, however, be unaffected as a change from a low level to a high level is needed to clock the counter. AND gate 76 having one input connected to the reset output of F/F 68 and the other input connected to the set output of F/F 70 generates a signal designated as RC which indicates that a channel belonging to the C group of channels is being defined.

Upon the generation of the next ripple carry signal from counter 52, F/F 68 will be clocked set and F/F 70 will be clocked reset. This is the fourth such signal from counter 52 and therefore should correspond to the time for the fourth channel or in the alternate notation used herein channel A2. The setting of F/F 68 causes its Q output to change from a low level to a high level thereby clocking counter 72 to the next count. This count represents the channel designated as the second channel in each of groups A, B and C. AND gate 80 once again generates the signal RA which indicates that the time for a channel belonging to the A group of channels is being defined.

The clocking of counters 52 and 72 and the setting and resetting of F/F's 68 and 70 continues until the time for channel 24, that is the eighth channel in the C group, is reached. While the channel contains only eight bits, counter 52 must count one more recovered clock pulse after the generation of the ripple carry signal before being reset to the prewired count. This additional count defines the bit time associated with the "S" bit. Normally the generation of the ripple carry signal would by the operation of gate 60 provide the low level signal at the LD input of counter 52 to allow the prewired number to be clocked into the counter. The operation of gate 60 is, however, blocked by the output signal developed by AND gate 58.

Gate 60 has one input connected to the output of gate 58. Normally gate 58 develops a high output signal allowing gate 60 to operate upon the occurrence of ripple carry signal so as to develop the low level at the LD input. Gate 58 has one input connected to the reset output of F/F 68 and the other input connected to the ripple carry (RC) output of counter 72. During the period of time designated as the eighth channel of each group counter 72 has reached its maximum count and its RC output is high. With F/F 68 reset and F/F 70 set to indicate the C group both inputs to gate 58 are high thereby resulting in a low level signal being generated which blocks gate 60. Thus for the recovered clock pulses corresponding to the 24th channel, counter 52 is allowed to count the additional clock pulse for the "S" bit.

For the 24th channel loading of the prewired count into counter 52 is controlled by AND gate 62. Gate 62 has one input connected to the output of gate 60 and the other input connected to the QD output of counter 52. Gate 58 has blocked gate 60 from generating the signal to load the predetermined count into counter 52 at the time corresponding to bit eight of the 24th channel. Therefore counter 52 is allowed to count one additional count to thereby count the clock pulse corresponding to the "S" bit. For each channel counter 52 counts from the predetermined count of 1000 to the end count of 1111. For each channel, the QD output of the counter is therefore always high. For the 24th channel counter 52 counts one additional count to 0000 thereby allowing the QD output to go low. Gate 62 is therefore allowed to generate the signal to load the predetermined count in the counter.

Referring to FIG. 4b there is shown a typical embodiment for frame sync circuit 46 and receive alarm detector 48 of FIG. 3. As previously described circuit 46 first operates in a search mode to look at the received bit which falls in the time arbitrarily designated by circuit 38 as corresponding to the "S" bit time.

Circuit 38 designates the "S" bit time when the QD output of counter 52 goes high. The QD output of counter 52 is connected to the CK input of flip-flop 96. The $\overline{Q}$ output of the F/F is connected to its D input. Assuming the F/F to be initially reset, upon the generation of the first QD signal from counter 52 the F/F sets. Setting of the F/F in the manner described above arbitrarily defines the "S" bit time for frame one. It should be appreciated that this designation is at this time totally arbitrary as circuit 46 is searching for the actual sync bit.

With F/F 96 now set, its D input will be low. Upon the generation of the next QD signal from counter 52 the F/F will reset. F/F 96 will therefore set upon the generation of the first and subsequent odd QD signal's from counter 52 and will reset upon the generation of the second and subsequent even QD signals from counter 52. Thus the set output of F/F 96 alternates between a high level and a low level signal on a frame by frame basis and is defined as a high level during the arbitrarily designated odd frames.

AND gate 100 having one input connected to the Q output of F/F 96 and the other input connected by inverter 98 to the QD output of counter 52 and OR gate 102 having one input connected to the output of gate 100 and its other input connected to receive the clock signal from clock recovery circuit 36 (FIG. 3) combine the output of F/F 96 with the sync and clock pulses to thereby generate at the output of gate 102 a signal which represents odd sync pulse high. Thus, F/F 96 and gates 100 and 102 combine to arbitrarily define the odd frame number sync pulse time without regard for where the sync bit may actually be in the bit stream received from the central office by receiver 26.

The output of OR gate 102 is connected to one input of OR gate 84. The output of OR gate 84 is connected to the CK input of F/F 82. The D input to F/F 82 is connected to the output of interface circuit 28. Circuit 28 has converted the received bipolar bit stream into a unipolar return to zero signal. Interface circuit 28 further converts the RZ signal into a non-return to zero (NRZ) signal which is connected to the D input of F/F 82. Conversion of the received signal from the RZ format to the format may be accomplished, for example, by a flip-flop (not shown) whose clock input is connected to the recovered clock signal and whose D input is connected to the RZ signal. The NRZ signal therefore appears on the $\overline{Q}$ output of the flip-flop.

The bit time arbitrarily designated as corresponding to the first odd sync pulse is used to clock the received data bit falling within this time slot into F/F 82. Thus F/F 82 is used to store the received bit which has arbitrarily been designated as corresponding to the first sync bit.

The reset output of F/F 82 is connected to one input of exclusive OR gate 86. The other input to gate 86 is connected to receive the NRZ bit stream from interface circuit 28. Each time a received bit corresponds to the first odd sync bit stored in F/F 82, gate 86 generates a low level signal at its output which is connected to the D input of F/F 106. As Gate 86 is connected to the reset output of F/F 102 it is comparing the inverted sync bit to the NRZ bit stream. The CK input to F/F 106 is connected by inverter 104 to the output of inverter 102. Upon the generation of the next bit time arbitrarily designated as corresponding to the sync bit of the next odd frame a positive pulse appears at the CK input to F/F 106. Gate 86 compares the received bit at that time with the prior arbitrarily designated sync bit which has been stored in F/F 82. If the two bits are the same, be they both zeroes or both ones the simultaneous appearance of a low level at the D input to F/F 106 and the clock signal at the F/F's CK input results in the resetting of the F/F. The latest bit arbitrarily designated as the sync bit is clocked into F/F 82. If the two bits are not the same then the F/F is set at this time. Thus, F/F 106 represents the frame status and in particular indicates an in frame condition if it is reset and an out of frame condition if it is set. It should, however, be appreciated that the fact that F/F 106 is reset does not in and of itself insure that frame synchronization has occurred, but is rather an indication that two bits which are separated from each other by two frames are identical and appear to be the sync bit.

The setting of F/F 106 indicates that the two bits separated by two frames are not of the same polarity. The sync bit has not been found and an out of frame condition exists. It is therefore necessary to designate a different bit as the sync bit. The selecting of a new sync bit could be accomplished by randomly designating another bit time as corresponding to the sync bit time and testing the bit falling in that time to determine if it is the sync bit. In order, however, to minimize the time to accomplish frame synchronization and also provides a systematic search for the sync bit the new sync bit time is defined by designating the next adjacent bit time as the sync bit. The next adjacent bit time is so designated by stealing one pulse from the clock input to counter 52 of divider 38 (FIG. 4a). The stealing of one clock pulse results in counter 52 effectively shifting its counting the equivalent of one bit time to thereby define the next adjacent bit as the "S" bit.

The stealing of one clock pulse from counter 52 is accomplished in the following manner. The clock input to counter 52 is from the output of AND gate 94 (FIG. 4b). Gate 94 has one input connected to the Q output of F/F 90 and the other input connected by inverter 92 to the recovered clock signal from clock recovery circuit 36. The D input of F/F 90 is connected to the output of AND gate 88 which in turn has one of its two inputs connected to Exclusive OR gate 86. Normally F/F 90 is set and the recovered clock pulses are passed through gate 94 to the CK input of counter 52. When the output of gate 86 goes high at the time corresponding to the sync bit, gate 88 placed a low level at the D input of F/F 90. At the next recovered clock pulse the F/F resets thereby blocking gate 94. At the next recovered clock time the D input of F/F 90 again is high allowing F/F 90 to set to thereby allow clock pulses through gate 94. In effect gate 94 has been blocked for one clock time thereby suspending the counting of counter 52 and the operation of divider 38 for that period of time. Simultaneously, the next bit on the received data stream is clocked into F/F 82 and becomes the newly designated "S" bit.

As described above the fact that F/F 106 is reset does not in and of itself indicate that the true sync bit has been located. The randomness of the received data may give a false indication of frame synchronization. Further, once synchronization has truly occurred an error in the received data may give a false indication that synchronization has been lost thereby reinitiating the search for the sync bit. Sync circuit 46 will operate in its search mode as long as F/F 90 is set. It has been seen that the resetting of F/F 90 for one recovered clock time allows circuit 46 to designate the next adjacent bit time as the sync bit. Holding F/F 90 reset for any appreciable length of time will therefore terminate the operation of circuit 46 in its search mode. F/F 90 has its C (clear) input connected to the output of operational amplifier 108. Amplifier 108, associated resistors R4 and R5 and light emitting diode (LED) 110 comprise receive alarm detector 48. Thus amplifier 108 may be used to terminate the search mode once synchronization is achieved or allow reinitiation of the search mode if synchronization is lost.

Amplifier 108 has its inverting input connected by the series combination of resistors R1 and R2 to the set output of F/F 106 and its noninverting input connected by the series combination of resistor R3 and diode D2 to the recovered clock pulses. Amplifier 108 has its inverting input also connected to a capacitor C1 which in turn is connected to a source of negative D-C voltage, −V. When gate 86 indicates a comparison, F/F 106 resets thereby allowing C1 to discharge with a time constant dependent on the resistance of the series combination of resistors R1 and R2 and the capacitance of the capacitor. The value of this time constant determines the additional period of time for which the search mode is enabled and is typically in the order of the time equivalent to about 10 frames. In the system described herein the time for one frame is 125 microsecs. If the true sync bit has been located, F/F 106 will remain reset for sufficient time to allow capacitor C1 to discharge to thereby enable amplifier 108 to disable the search mode. If during this period of time gate 86 should indicate that the bit thought to be the "S" bit is not that bit, then F/F 106 will set thereby allowing C1 to charge. Gate 86 may indicate an error even if the true sync bit has been located, if an error should occur in the received data. Thus resistor R1 and R2 and capacitor C1 establish an upper limit to the time for terminating the search mode once synchronization has been achieved.

When capacitor C1 is fully discharged, amplifier 108 then holds F/F 90 clear terminating the search mode. F/F 82 still holds the last received sync bit and gate 86 still compares the next received odd frame sync bit with the contents of F/F 82. Should framing be lost once it is achieved circuit 46 must switch back to its search mode to reinitiate the search for the framing bit. It is however, desirable that the search mode not be enabled immediately as the loss of framing may be due to an error in the received data. Reinitiation of the search mode once framing has been achieved is under the control of the time constant determined by resistor R1 and capacitor C1. The values of R1 and C1 are selected such that reinitiation of the search mode will occur within about three frame times after synchronization has been lost. Thus resistor R1 and capacitor C1 establish an upper limit to the time for reinitiating the search mode once frame synchronization is lost.

LED 110, shown in block diagram form in FIG. 4b, is a light emitting diode having its cathode connected to the output of amplifier 108 and its anode connected by one or more resistors (not shown) to both a source of positive voltage, the clear input of F/F 90 and the junction of resistor R2 and capacitor C1. Loss of frame will cause the output of amplifier 108 to go low thereby lighting LED 110. Once reframing has been accomplished the LED 110 will be turned off.

Loss of frame may not only result from errors in the received data but may also result from the loss of the received PCM signal. It is, however, possible that the received PCM signal may be lost in a manner such that F/F 106 still indicates an in frame condition. To insure that a receive alarm will be indicated under all conditions, amplifier 108 has its noninverting input connected to the recovered clock signal through diode D2. Diode D2 rectifies the recovered clock. Capacitor C2 and resistor R3 filter the rectified clock signal to provide a d-c level at the noninverting input to amplifier 108. Loss of the received carrier results in a loss of the d-c level which in turn causes the output of amplifier 108 to go low thereby lighting LED 110.

Figure 5:
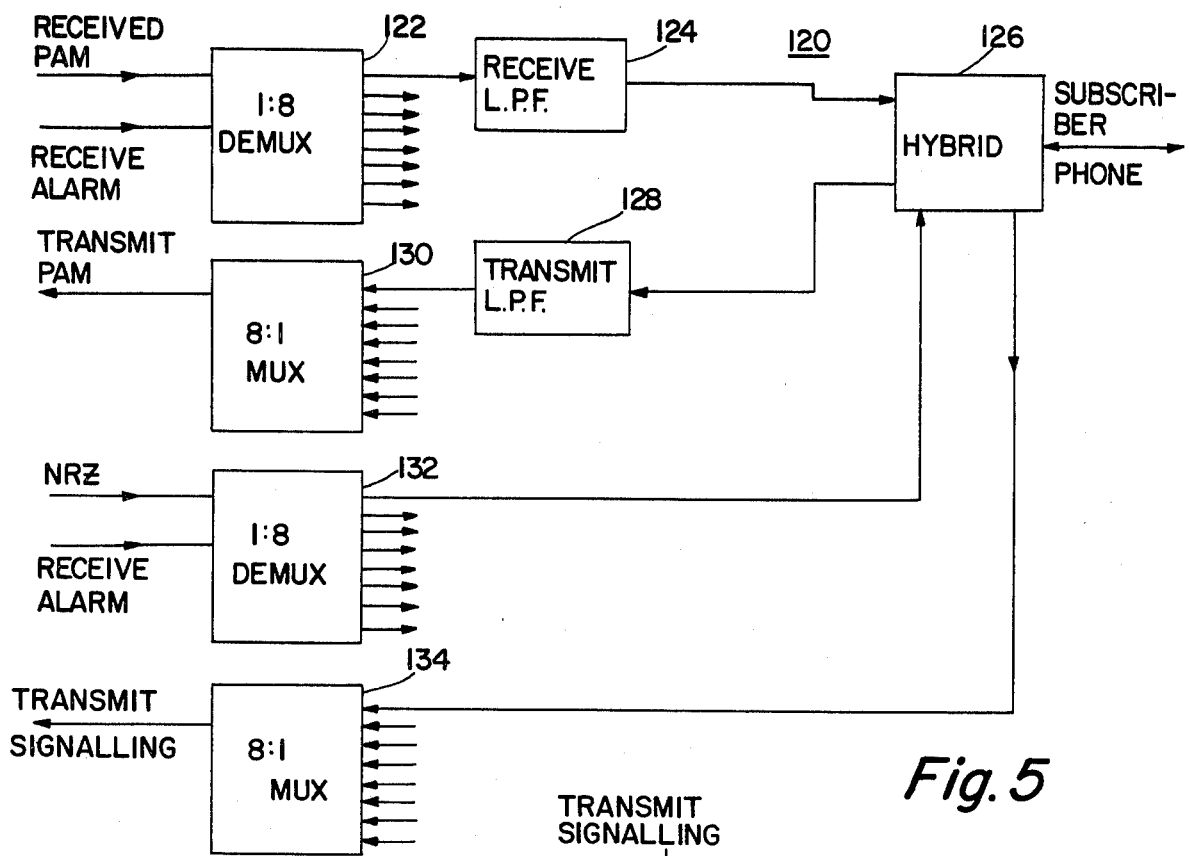
FIG. 5 is a block diagram showing a channel card circuit for interfacing the terminal with one group of subscribers connected thereto.

The receive alarm generated by receive alarm detector 48 is connected to the channel circuit associated with each group of eight subscribers. The channel circuit, a schematic diagram of which is shown in FIG. 5, provides an interface between the subscribers connected to terminals 14 and 16 and the receive and transmit portions thereof. As will be described in more detail hereinafter in connection with FIG. 5 the receive alarm inhibits the channel circuitry from sending decoded message signals and signalling information to its associated subscribers until after the termination of the condition causing the alarm.

Referring again to FIG. 3 there is shown signalling frame synchronization circuit 50 which is used to decode the times when frames 6 and 12 are being received from the central office. Frames 6 and 12 contain in the least significant bit of each byte the signalling information for the associated channel. Thus, it is important that receiver 26 identify when these frames are being received.

Circuit 50 utilizes the information contained in the sync bits of the even received frames to perform its synchronization function. In the system being described herein the even frame sync bits follow the pattern of 000111 wherein the first one of the 111 sequence is defined as being associated with frame 6. Frame 12 is defined as the frame containing the first zero of the 000 sequence. In order to decode the even frame sync bits circuit 50 may for example comprise two flip-flops interconnected so as to clock through the received even frame sync bits. The flip-flops receive clock pulses on their inputs which are derived from the combination of the received data and the reset output of flip-flop 96 of FIG. 4b. Flip-flop 96 as described previously has a low level signal at its reset output during odd frames and a high level signal at that output during even frames. The set output of the first flip-flop comprising circuit 50 is connected to the D input of the second flip-flop. AND gates are suitably connected to the flip-flops various outputs to thereby decode the sync bits corresponding to frames 6 and 12.

The indication of frames 6 and 12 are sent to the channel circuit associated with each group of eight channels to thereby allow the signalling information for each subscriber connected thereto to be decoded. As circuit 50 may give a false indication of decoding the time associated with frame 6 and 12, the signalling information decoded by the channel circuit is inhibited or muted and not sent to the associated subscriber until that circuit receives an indication from receiver 26 that framing has truly occurred. Such an indication occurs when frame sync circuit 46 terminates its search mode of operation. At that time the receive alarm signal generated by receive alarm detector 48 is removed and the channel circuit is then allowed to transmit the signalling information and also decoded message signals to its associated subscribers.

Referring to FIG. 5 there is shown a block diagram of the channel circuit 120 which serves to interface the receive and transmit portions of terminal 14 and/or 16 with the subscribers connected thereto. As described previously the channels in the system are arranged into three groups A, B and C of eight channels each. Circuit 120 provides the interface between one group of eight channels and the receive and transmit portions of the respective terminal. For the system being described herein it has been assumed that there are sixteen channels at the subscriber terminal and eight channels at the drop terminal. Thus at the subscriber terminal there are two circuits identical to that shown in FIG. 5 to serve the two groups of eight channels located there and at the drop terminal there is one circuit also identical to that shown in FIG. 5 to serve the one group of eight channels located there.

The receive portion 26 of each terminal has at the output of expandor 32 a multichannel PAM signal. This signal contains the messages for all of the 24 subscribers serviced by the system. Circuit 120 takes this signal and in combination with the timing signals generated by receiver 26, extracts the messages for the eight subscribers serviced by circuit 120. One to eight analog demultiplexer 122 breaks the received PAM into the message signals for each of the subscribers served by circuit 120. Demultiplexer 122 responds to the received PAM and various timing signals generated by receiver 26. The timing signals indicate the particular group of eight to which the channels served by circuit 120 belong. Demultiplexer 122 may, for example, be the combination of RCA chip types 4028 and 4161.

The demultiplexed received PAM signals are provided to the subscribers serviced by circuit 120 through the combination of a low pass filter 124 and a hybrid circuit 126. There is one low pass filter and one hybrid for each of the eight subscribers serviced by circuit 120. For convenience only one such filter and hybrid has been shown in FIG. 5. The output of the low pass filter is connected through hybrid 126 to the subscribers telephone. Hybrid 126 as well known in the art provides impedance matching between circuit 120 and the subscriber's telephone as well as providing isolation between the received PAM for the subscriber and the analog signal to be transmitted from the subscriber to the central office.

The analog signal to be transmitted from the subscriber to the central office is passed through hybrid 126 and transmit low pass filter 128 to an eight to one analog multiplexer 130. Each subscriber has his own transmit low pass filter and for convenience only one such filter has been shown in FIG. 5. Multiplexer 130 combines the analog signals from each of the eight subscribers serviced by circuit 120 to generate at its output a pulse amplitude modulated signal. Multiplexer 130 also receives timing signals from the receive portion 26 of the terminals in order to perform its multiplexing. The same chip types used to embody the demultiplexer may also be used to embody the multiplexer. The output of multiplexer 130 is then passed to the transmitter portion of the terminal which will be described in more detail hereinafter.

Circuit 120 also provides the interfacing between the terminal and the subscriber's telephone for the signalling information. As described previously signalling information for the subscriber's phone is contained in frames 6 and 12 of the PCM signal transmitted from the central office. Circuit 120 breaks out the signalling information for the particular subscribers connected to the circuit. As described in connection with FIG. 3 the signalling information is in the NRZ format. One to eight analog demultiplexer 132 in combination with signals from the receive portion 26 of the terminal breaks out the signalling information for the eight subscribers serviced by circuit 120. This signalling information is passed through the hybrid 126 associated with the particular subscriber. Signalling information from the subscriber to the central office passes through the associated hybrid to one input of an eight to one multiplexer 134. Multiplexer 134 takes the signalling information to be sent to the central office from the eight subscribers serviced by circuit 120 and in combination with signals from receiver portion 26 of the terminal generates a composite signal. This composite signal which contains the transmit signalling information for the subscribers is then sent to the transmit portion of the terminal for transmission in the proper time sequence to the central office.

Message demultiplexer 122 and signalling demultiplexer 132 also respond to the receive alarm signal generated by receive alarm detector 48 (FIG. 3) upon the occurrence of one of the alarm conditions described previously. The receive alarm signal inhibits transfer of the message signals and signalling information to the associated subscribers served by circuit 120 until after the termination of the condition causing the alarm.

Figure 6:
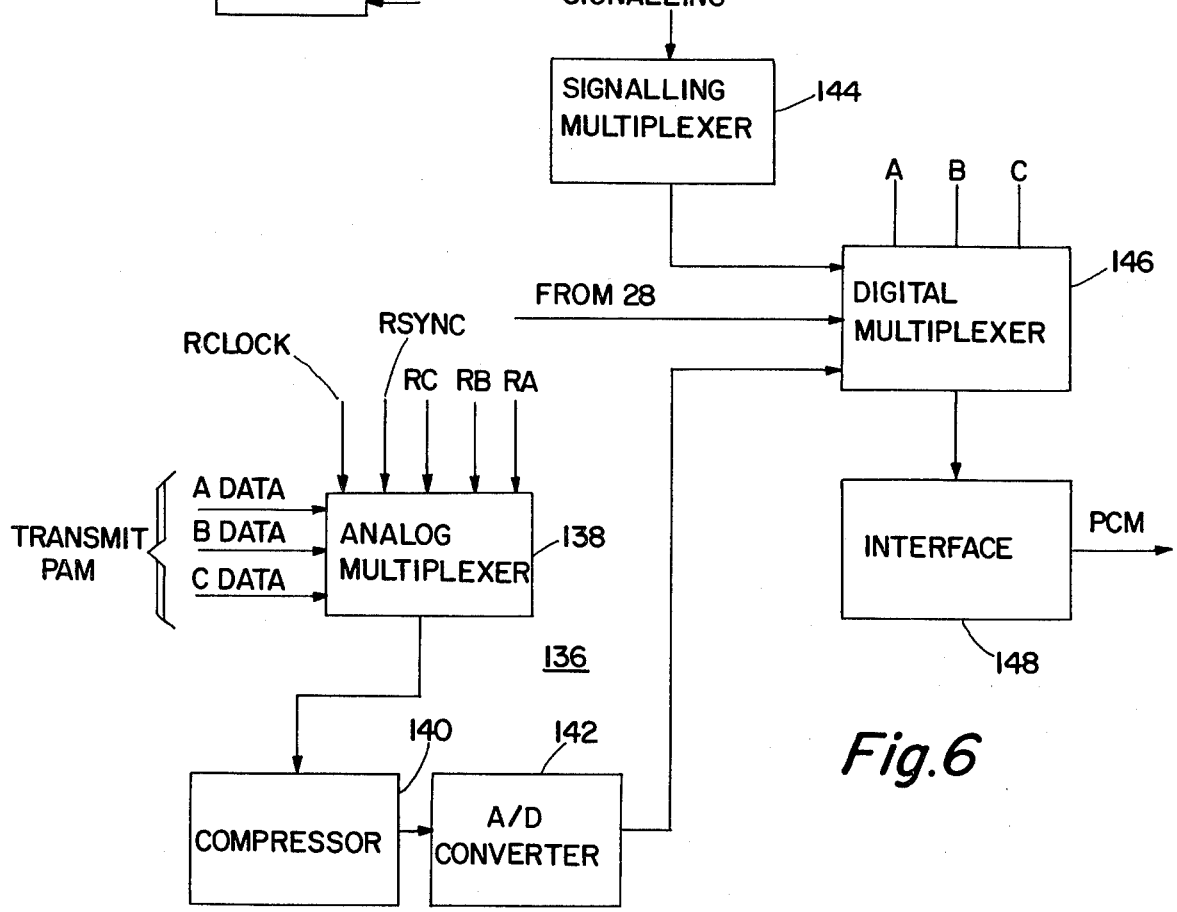
FIG. 6 is a block diagram of the transmitter section of each of the remote terminals shown in FIG. 1.

Referring to FIG. 6 there is shown a block diagram of the transmitter portion 136 of either subscriber terminal 14 or drop terminal 16. As will be described in more detail hereinafter the transmitter portion of the terminal combines in the proper time sequence the digitally encoded analog message signals from the subscribers connected to the terminal with the received message signals for subscribers not connected to the terminal to thereby provide at the terminal output a 24 channel time multiplexed PCM signal. The signal at the terminal output is identical in format to the signal received at the terminal input. The principal difference between the terminal output and input signals is that messages from the terminal's subscribers to the central office have been put into the time slots corresponding to those subscribers thereby replacing the messages for these subscribers from the central office.

Analog multiplexer 138 multiplexes in time the transmit PAM message signals from the associated channel electronics 120(FIG. 5) for those subscribers connected to the terminal. The message signals are connected to multiplexer as the inputs designated as A data, B data and C data. For the system being described herein it has been assumed that 16 channels are located at the subscriber terminal and 8 channels are located at the drop terminal. Thus for the subscriber terminal two of the three data inputs to multiplexer 136 have messages on them whereas for the drop terminal only one of the three data inputs would have message signals on it. For those channels not located at a particular terminal the corresponding data input to multiplexer would not have any analog signals on it. The output signal from multiplexer 138 therefore comprises a time multiplexed PAM signal whose amplitude would be zero during those time intervals corresponding to the channels not located at the particular terminal. Multiplexer 138 may for example comprise the combination of three RCA type CD4016 quad bilateral switches. Each of the switches would be associated with a respective one of the channel groups and would be responsive to the associated analog data as well as the corresponding one of the signals RA, RB and RC generated in receiver 26. The output of each switch would be connected together to thereby provide the time multiplexed analog signal.

The time multiplexed analog signal from multiplexer 138 is connected to compressor 140 which converts the uncompressed analog signal for each channel into a compressed analog signal in accordance with a predetermined compression characteristic. For the T1 D3 type system being described herein the compression characteristic substantially follows the mu-255 law. The compressed analog signal out of compressor 140 is converted into a digital signal by A/D converter 142.

Compressor 140 and converter 142 may take any one of a number of forms. Compressor 140 may be an instantaneous compressor of the type described in the aforementioned U.S. patent application Ser. No. 185,892. Converter 142 may than for example be of the linear type which utilizes the successive approximation technique to perform the analog to digital conversion. The linear type converter comprises the combination of a comparator, an A/D converter chip such as the DAC08 type chip and a successive approximation register (SAR) such as the DM2502 type chip manufactured by National Semiconductor.

The successive approximation technique accomplishes conversion of the analog PAM signal into an eight bit digital signal one bit at a time starting with the most significant bit (MSB). The conversion is initiated by setting the SAR to 10000000 which is half scale or zero volts. The converter chip converts the contents of the SAR to zero volts which in turn is compared by the comparator to the amplitude of the analog PAM signal. If the sample amplitude is greater than zero volts the MSB is a one. The MSB is clocked into the SAR which in turn changes the digital input to the converter chip. The converters analog output therefore changes. The new analog signal is again compared to the sample amplitude. If the sample amplitude is greater than the converter's analog output the bit adjacent to the MSB is a one. If the sample amplitude is less than the converter output the bit adjacent to the MSB is a zero. The process of clocking bits into the SAR and then comparing the converter analog output signal with the sample amplitude is continued until all eight bits are generated. At the end of the process the SAR contains eight bits which represent the conversion of the compressed PAM signal into a digital signal. This signal is in the offset binary format wherein the signal ranges from all zeros at maximum negative input to 01111111/10000000 at zero volts input to all ones at maximum positive input. The offset binary signal must be converted to the D3 format prior to being digitally multiplexed with NRZ message signals for those subscribers not located at the terminal.

The D3 signal format as described in connection with FIG. 3 utilizes eight bits wherein the most significant bit (MSB) indicates polarity and is a zero if the signal is negative and a one if the signal is positive. Conversion from offset binary to D3 format requires that the most significant bit of the offset signal be stored and if it is high inverting the remaining seven bits and if it is low not inverting the remaining seven bits. Circuitry for accomplishing this conversion may for example be comprised of a D type flip-flop which stores the MSB and uses the flip-flops D output as one input to an exclusive OR gate. The other input to the gate is the remaining seven bits. The gate serves to invert these bits if the MSB is a one.

The output signal of A/D converter 142 appears as one input to digital multiplexer 146. Multiplexer 146 also receives inputs from the output of signalling multiplexer 144 and from the receiver portion of the terminal. The signal from the terminals receiver portion is the received 24 channel PCM signal after it has been converted to the NRZ format. Multiplexer 146 also has the control input signals designated as A, B and C in FIG. 6. These signals indicate whether or not a particular group of channels are located at the terminal. As will be described in more detail hereinafter multiplexer 146 uses the control input signals to multiplex in time the output signal from A/D converter 142 with the NRZ data from the terminals receiver portion. For those channels located at the terminal, multiplexer 146 places in the appropriate time slots that portion of the output signal from converter 142 corresponding to those channels. For those channels not located at the terminal, multiplexer 146 places in the appropriate time slots that portion of the NRZ data corresponding to those channels. Thus, multiplexer 146 generates a time multiplexed signal which is the combination of the message generated by the channels located at the terminal and the messages received at the terminal for channels not located there.

Figure 7:
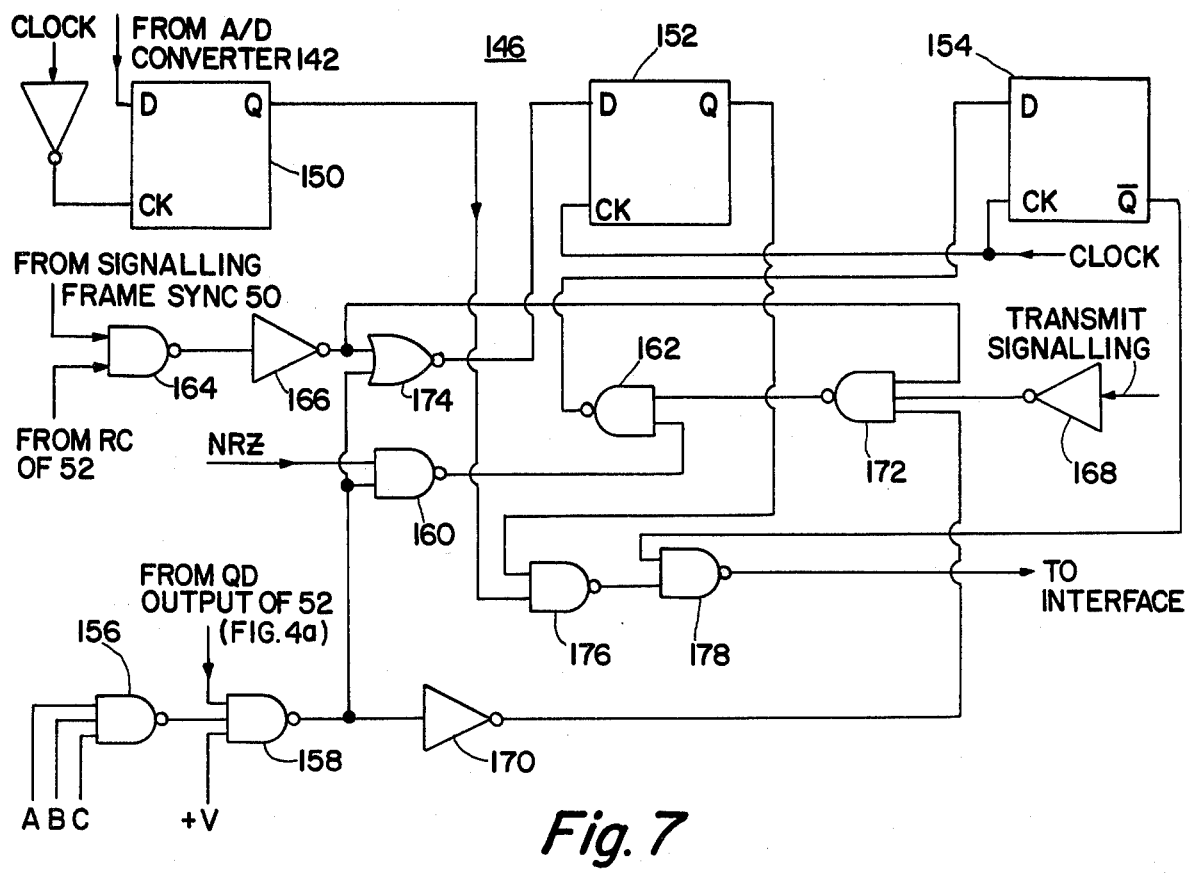
FIG. 7 is a schematic diagram showing circuits for various ones of the blocks shown in FIG. 6.

Referring to FIG. 7 there is shown a combined block schematic diagram of the digital multiplexer 146 of receiver 136. Multiplexer 146 functions to replace the message information transmitted from the central office for those subscribers located at the terminal with the newly generated message information. Multiplexer 146 also functions to replace the signalling information transmitted from the central office for those subscribers located at the terminal with the newly generated signalling information. Finally multiplexer 146 functions to allow message and signalling information received by the terminal for those subscribers not located at the terminal to be transmitted unchanged.

Multiplexer 146 includes flip flops 150, 152, and 154 as well as associated logic circuitry. The flip flops allow for the occurrence of the functions described above. In particular flip flop 150 has its D input connected to the output of A to D converter 142 of FIG. 6 to thereby store the messages for the subscribers located at the terminal. The clock input of flip-flop 150 receives the recovered clock signal. Flip flop 152 provides the timing for controlling the insertion of information into those time slots of frames 6 and 12 which correspond to the signalling bit. Flip flop 154 contains depending on the signal at the D input thereof messages and signalling information received by the terminal for subscribers not located at the terminal or for those channels where subscribers are located at the terminal the new signalling information from those subscribers to be transmitted back to the central office. Flip flop 154 also has its clock input connected to the recovered clock signal.

Three input AND gate 156 functions in a manner to generate a high output signal whenever a particular channel is located at the terminal. Each of the inputs to gate 156 are connected to one end of a switch (not shown) and that end is in turn connected by a resistor to a source of positive voltage. The other end of the switch is connected to receive the RA, RB, and RC signals generated by receiver 26. Each switch corresponds to one of the three groups of eight channels. If a particular group of channels is located at the terminal, the corresponding switch is closed. Therefore when a time slot corresponding to a particular group of channels located at the terminal occurs the output of gate 156 goes high. The output of gate 156 is connected as one input to three input AND gate 158.

Gate 158 has one of its other inputs connected to a source of positive voltage and the last of its inputs connected to the QD output of counter 52 (FIG. 4A). Gate 158 generates a low signal only during the time slot corresponding to the sync bit. At all other times the output of gate 158 is high. The output of gate 158 is one input to AND gate 160. The other input to gate 160 is the NRZ signal from receiver 26. This data is the time multiplexed PCM signal which has been received from the transmission line by either terminal 14 or 16. The output of gate 160 appears as one input to AND gate 162. The other input to gate 162 comes from the output of AND gate 172. The output of gate 162 is connected to the D input of flip flop 154. Thus, the output of gate 162 is clocked into flip flop 154 in accordance with the recovered clock signal.

The output of gate 162 is the received PCM signal which contains messages and signalling information for all of the channels in the system whether or not they are located at the terminal. For those channels located at the terminal it is desired to replace the messages and signalling received from the central office with the messages and signalling generated by the subscriber telephones connected to the terminal. The new message information is as described previously contained in flip flop 150. The new signalling information is available from the channel circuit described in FIG. 5. The old signalling information is contained in flip flop 154. It is therefore necessary to replace in the proper time sequence the old signalling information with the new signalling information prior to transmission of the PCM signal from the terminal.

The replacement of old signalling information with new signalling information is accomplished by gate 172. Gate 172 has one input connected through inverter 170 to the output of sync gate 158. Gate 172 has another input connected through inverter 168 to the transmit signalling information generated by the multiplexer of FIG. 5. The remaining input to gate 172 is connected to the series combination of AND gate 164 and inverter 166. Gate 164 has one of its inputs connected to the output of signalling frame sync circuit 50 and the other of its inputs connected to the ripple carry (RC) output of counter 52. The output of gate 164 and therefore the output of inverter 166 represents a timing signal which indicates when a time slot corresponding to a bit which represents signalling information is occurring. Thus gate 172 operates to place in the proper time sequence in the data flowing out of gate 160 and in turn stored in flip-flop 154 the signalling information for those channels located at the terminals.

As mentioned above the output of inverter 166 is a signal corresponding to the occurrence of the time slot representing the bit for signalling information. This signal is coupled through OR gate 174 to the D input of flip flop 152. The recovered clock signal appears on the CK input of the flip flop. Thus, the signal corresponding to the occurrence of a signalling time slot is clocked into the flip-flop.

The Q outputs of flip flops 150 and 152 are connected as inputs to AND gate 176. The output of gate 176 is connected as one input to AND gate 178. The other input to gate 178 comes from the reset side of flip flop 154. The output of gate 178 is connected to interface circuit 148 of FIG. 6. For those channels located at the terminal the PCM signal representing the new messages appears by the operation of gates 176 and 178 at the input to interface circuit 148. For those channels not located at the terminal, the message information previously transmitted from the central office appears by the operation of gate 178 at the input to interface circuit 148.

The signalling information appears at the input to interface circuit 148 through the operation of either gate 176 or 178. For those channels not located at the terminal the old signalling information which is stored in flip-flop 154 appears at the output of gate 178. For those channels located at the terminal the combination of flip-flop 152 and gate 176 allows the newly generated signalling information to appear at the output of gate 178. It should be appreciated that as multiplexer circuit 146 responds to the various timing signals generated by receiver 26 that the time multiplexed signal which appears at the input to circuit 148 occurs in proper time sequence. In other words if channel one is located at the terminal the new message and signalling information appears at the input to interface circuit 148 in exactly the time slots set aside for channel one. If channel one is not located at the terminal the old message and signalling information appears at the input to circuit 148 exactly in the time slots set aside for channel one. Thus multiplexer 146 functions to provide at its output a multichannel PCM signal which is exactly in time synchronization with the PCM signal received by the terminal.

Interface circuit 148 (FIG. 6) comprises the combination of a bipolar generator and a driver circuit (not shown). The bipolar generator which may for example be comprised of the combination of two flip flops and associated logic gates allows the signal which is transmitted from the terminal to be in the bipolar format. The bipolar format requires that every other one bit be inverted. The output of the bipolar generator is connected to the line driver which in turn is coupled to the transmission line by a transformer.

In connection with the description of FIG. 4b there was described operational amplifier 108 and associated components which detected loss of frame in receiver 26. When a loss of frame occurred op amp 108 generated a receive alarm signal which turned on a LED at the terminal. As loss of frame represents an error condition at the terminal (14 or 16) it is therefore desirable to bypass the terminal until the condition is corrected. It is also desirable to bypass the terminal (14 or 16) if either loss of power should occur at the terminal and/or loss of signal to be transmitted from the terminal should occur. Bypassing of the terminal is accomplished as described in connection with FIG. 1 by connecting the input of the terminal (14 or 16) to its output upon the occurrence of one or more of the conditions or faults described above. When the terminal in question is bypassed the subscribers connected thereto suffer a loss of service until the fault causing the bypass to occur is corrected. Service is still maintained, however, to the other subscribers connected to the system.

As also described in connection with FIG. 1 upon the occurrence of a fault condition on either cable pair 18 and/or 20 it is desirable to loopback terminal 16 and thereby attempt to maintain service to the subscribers connected to that terminal. A cable fault condition results in an error appearing in the signal on either pair 18 and/or 20. This error may be such that circuitry located in loopback circuit 24 and shown in FIG. 10 similar to that described in connection with the receiver section of terminal 14 or 16 may not be able to synchronize on the signal for purposes of framing. The error may on the other hand manifest itself as a loss of the high frequency clock signal used in transmitting the message signal. Finally the error may appear in the form of a bipolar violation. The message signals on cable pairs 18 and 20 are formatted such that those binary digits which are ones alternate in polarity. If two successive one bits occur with the same polarity this is considered to be a bipolar violation. The manner in which the error appears in the signal on pairs 18 and/or 20 quite obviously depends on the nature of the cable fault condition.

Figure 8:
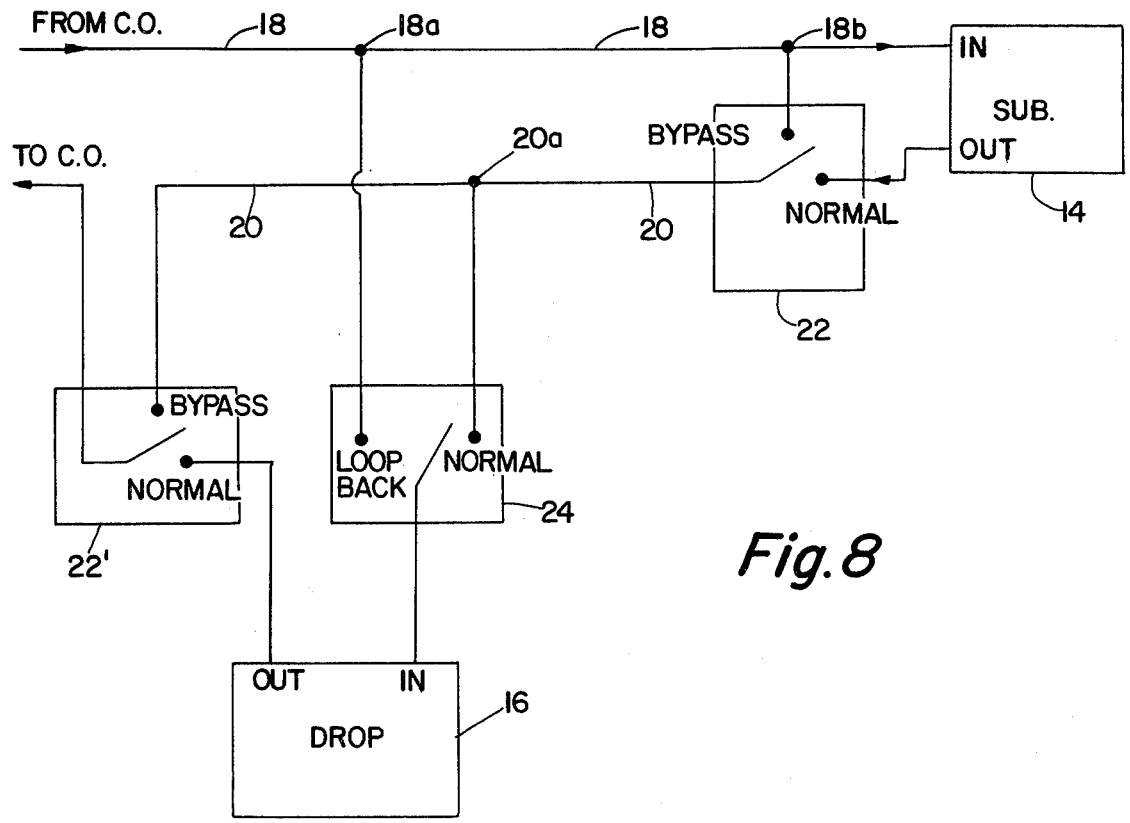
FIG. 8 is a block-schematic diagram showing in more detail the bypass and loopback circuitry shown in FIG. 1.

Referring to FIG. 8 there is shown a block schematic diagram of the bypass circuit 22 associated with subscriber terminal 14 and the bypass circuit 22' and loopback circuit 24 associated with drop terminal 16. Bypass circuits 22 and 22' are identical in structure and function and the operation of only one such circuit need be explained. As a drop terminal has both a bypass circuit and a loopback circuit present whereas a subscriber terminal has only a bypass circuit and as an error in the signal on pairs 18 and/or 20 may not only cause a drop terminal to bypass but also to loopback, the operation of circuits 22' and 24 will be described in detail. Schematics diagrams for these circuits are shown in FIGS. 9 and 10, respectively. The operation of circuits 22' and 24 will first, however, be described in general.

For ease of description at this point, circuits 22' and 24 are shown in FIG. 8 as effecting a switching function upon the occurrence of a terminal and/or cable pair fault condition, respectively. Under normal operating conditions where there are no terminal and cable fault conditions the switches in terminals 22' and 24 are connected to the contact designated as NORMAL in FIG. 8. For this condition cable pair 20 coming from terminal 14 is connected by loopback circuit 24 to the input of drop terminal 16. The output of terminal 16 is connected by bypass circuit 22' to that portion of pair 20 which connects terminal 16 to the central office. The subscribers serviced by terminal 16 are therefore able to receive messages from the central office and transmit messages to that office.

Assume the transmitter of terminal 16 is unable to provide the high frequency signal to be transmitted from the terminal. As described in more detail in connection with FIG. 9 circuit 22' operates to bypass the terminal by connecting that part of pair 20 which is returning directly to the central office to that part of line 20 coming from terminal 14. This connection is effected when the switch contained in terminal 22' connects to the contact designated as BYPASS in FIG. 8. It should be noted that the switch contained in circuit 24 is still connected to the NORMAL contact and the input of terminal 16 therefore still receives signal from terminal 14. This connection is desirable due to the fact that the transmitter of terminal 16 is slaved to its receiver and upon correction of the problem causing the bypass, the transmitter will have the necessary input to generate the high frequency signals once again. Upon correction of this terminal fault condition circuit 22' removes the bypass by reconnecting the output of the terminal to the portion of pair 20 which is going directly to the central office.

As mentioned above a terminal fault condition may arise from loss of power in the terminal. Upon the occurrence of such a fault condition circuit 22' bypasses the terminal. Circuit 24 as described above still leaves the input of the terminal connected to receive the signal transmitted by terminal 14. Upon correction of the power failure, circuit 22' reconnects the output of the terminal to the portion of 20 going directly to the central office and as the signal from terminal 14 is already at the input of terminal 16 the subscribers connected to that terminal receive service almost immediately.

Also as mentioned above a terminal fault condition may arise from a failure of terminal 16 to synchronize on the signal received from terminal 14. This failure to synchronize may result from a failure in the receiver section of terminal 16. If this is the case circuits 22' and 24 operate as described above for the other terminal fault conditions. On the other hand the failure of terminal 16 to synchronize on the received signal may be the result of an error appearing in the signal due to the occurrence of one of the cable fault conditions enumerated previously. Under these conditions circuits 22' and 24 will operate in the manner described below.

Assume for purposes of illustration that both circuit 24 and terminal 16 are unable to synchronize on the incoming signal on pair 20. The switch in circuit 22' will be caused to connect to BYPASS. By this operation the central office will receive directly the signal on that part of pair 20 between terminals 14 and 16. The switch in circuit 24 will be caused to operate and connect the input of terminal 16 to the contact designated as LOOPBACK. The input of terminal 16 is therefore connected to outgoing cable pair 18 at the point 18a. Rather than receiving the signal present on pair 20 the input to terminal 16 will receive the signal present on outgoing pair 18.

Assume further that terminal 16 is able to synchronize on the signal received from pair 18. Upon so synchronizing circuit 22' will be operated to reconnect the output of terminal 16 back to the central office. Loopback circuit 24 is still connected by the input of terminal 16 to pair 18. This connection, as will be described hereinafter, will be maintained so long as circuit 24 sees on that part of pair 20 between the two terminals a signal with an error rate greater than some predetermined acceptable level. The subscribers connected to terminal 16 will once again have service. The subscribers to terminal 14 will however lose their service until the cable fault condition causing the operation of circuit 24 is corrected. Thus circuit 24 has operated to loopback the system at a point 18a on pair 18 which is short of terminal 14.

Assume on the other hand that terminal 16 is unable to synchronize on the signal received from pair 18. This is an indication that the fault condition lies between the central office and point 18a. This information may be used to direct a serviceman to the location of the fault. System 10 utilizes an alarm scheme to be described hereinafter for accomplishing this purpose. Circuits 22' and 24 will therefore remain connected in their bypass and loopback modes of operation, respectively until the fault condition is corrected. As a result of the operation of circuit 24 the subscribers at terminal 14 will be without service and as a result of the operation of circuit 22' the subscribers at terminal 16 will also be without service. It should be appreciated that if the fault condition causing nonsynchronization lies any where on cable 18 then circuit 22 will also operate causing terminal 14 to be bypassed until the condition is corrected.

In summary a fault condition occurring in either terminal 14 or 16 will cause the associated circuit 22 or 22', respectively to operate and bypass the terminal. A cable fault condition will cause depending on its location the operation of circuit 24 to loopback the system by connecting the input of terminal 16 to pair 18 until the fault causing condition is corrected.

Referring to FIG. 9 there is shown a circuit diagram of the circuitry contained in each terminal for bypassing that terminal upon the occurrence of one or more of the faults described above. The transmission line upon which the terminal under normal operating conditions receives the multichannel PCM signal is designated as 180. The transmission line upon which the terminal under normal operating conditions transmits the multichannel PCM signal containing new messages and signalling for those subscribers located at the terminal and previously received messages and signalling for those subscribers not located at the terminal is designated as 184.

A relay $RY_1$ which is energized and normally closed under no fault operating conditions provides a connection between the input and output transmission lines 180 and 184 upon the occurrence of a fault condition. Under no fault operating conditions there is no electrical connection between the input and output lines and the terminal operates to receive and transmit PCM signals. Relay $RY_1$ is kept energized through the operation of transistor 194. Under no fault conditions the transistor conducts. As will be described in more detail hereinafter upon the occurrence of a fault the transistor turns off thereby deenergizing the relay. Thus the occurrence of a fault condition results in the electrical interconnection of lines 180 and 184 thereby bypassing the subscribers at the associated terminal.

A transformer 186 has its primary winding connected to the output of interface circuit 148 and its secondary winding connected across line 184. The output of circuit 148 is the bipolar PCM multichannel signal generated by the terminal for transmission on line 184. The secondary of transformer 186 is also connected to identical circuits 196 and 198 which monitor the bipolar PCM signal to determine if there is a loss of either positive or negative pulses in the bit stream.

Circuits 196 and 198 are identical and comprise comparators 188 and 190, respectively, and associated circuit components. Connected to the noninverting input of each of comparators 188 and 190 is the parallel combination of a capacitor ($C_3$ or $C_4$) and a resistor ($R_7$ or $R_8$). The component values for the resistor and capacitor are chosen in a manner such that the mere absence of a small number of positive or negative pulses does not result in the indication of a fault condition and the bypassing of the terminal. When unipolar pulses are present upon the secondary of transformer 186 the capacitors $C_3$ and $C_4$ are charged through the associated diode D3 or D4, respectively. The absence of pulses causes the capacitor to discharge through its associated resistor. The inverting inputs of comparators 188 and 190 are connected by resistor R9 to a source of positive voltage $+V$. When either or both of capacitors $C_3$ or $C_4$ becomes sufficiently discharged its associated comparator generates a signal which indicates that a loss of output pulses (either positive or negative or both) have occurred. The output of comparators 188 and 190 are connected by a diode D6, poled as shown, to the inverting input of comparator 192. Thus the inverting input of comparator 192 goes low when a loss of output pulses occur.

The inverting input of comparator 190 is also connected by diode D8, poled as shown, to the output of amplifier 108 (FIG. 4b). Amplifier 108 provides an output signal when a loss of frame condition is detected. The inverting input to comparator 192 is also connected by a resistor R11 to a source of positive voltage $+V$. The noninverting input to comparator 198 is connected to ground. The output of the comparator is connected by resistor R12 to the base of transistor 194.

Under no fault conditions the output of comparator 192 is such that transistor 194 conducts thereby keeping relay $RY_1$ energized. Upon the occurrrence of a fault, be it loss of transmit pulses or loss of frame or any combination thereof, the output of comparator 192 changes to thereby turn transistor 194 off. When transistor 194 ceases conducting the relay $RY_1$ is deenergized thereby electrically connecting lines 180 and 184 together. Loss of power at the terminal, will of course, result in loss of voltage at the terminal thereby automatically deenergizing relay $RY_1$. Thus, upon the occurrence of a fault condition PCM signals at the terminal's input are electrically connected to the terminal's output resulting in the bypassing of subscribers served by the terminal.

The inverting input of comparator 192 is also connected to the cathode of a diode D7. The anode of diode D7 is connected to the receive demultiplexer 122 contained in channel circuit 180 (FIG. 5). Upon the occurrence of a fault condition at the terminal which results from either loss of frame or loss of transmit pulse(s) a signal is generated which by the operation of diode D7 results in the receive demultiplexer being turned off. In this manner the occurrence of a fault condition results in a loss of service to those subscribers served by the terminal. It should be appreciated that a fault condition resulting from loss of power at the terminal automatically terminates service to the subscribers served by the terminal.

It should further be appreciated that while the occurrence of a fault condition deenergizes relay $RY_1$ thereby electrically interconnecting lines 180 and 184 the receiver portion 26 of the terminal still receives the multichannel PCM signal from transmission line 180. In this manner receiver circuit 26 still tries to synchronize on the incoming signal. If the fault results from a loss of frame condition it is desirable to allow the terminal to attempt to reframe on the incoming PCM signal. If the receiver is able to reframe, the fault condition will be removed from comparator 192 and transistor 194 will conduct thereby reenergizing relay $RY_1$.

Further if the fault results from a loss of output pulse(s) it is also desirable to allow the terminal to restore service upon the correction of the fault. Allowing the incoming PCM signal to still be received by the terminal ensures that the transmitter portion of the terminal will attempt to generate bipolar pulses from the received signal. Upon the generation of bipolar pulses and the detection thereof by circuits 196 and 198 the relay $RY_1$ will be reenergized.

In summary then the occurrence of a fault at the terminal resulting either from loss or frame or loss of transmit pulses or loss of power at the terminal deenergizes the relay $RY_1$. When the relay is deenergized the incoming PCM signal to the terminal is automatically connected to the terminals output. The signals are still sent to the terminals receiver-transmitter circuitry to thereby allow reenergizing of the relay upon termination of the fault causing condition. The incoming PCM signal is however blocked at the channel circuit from being sent to the subscribers. Thus, a fault at the terminal results in the loss of service to the subscribers connected thereto and a bypassing of the terminal.

As described previously loopback circuit 24 operates to connect the input to the terminal 16 to the outgoing pair 18 upon the occurrence of a cable pair fault condition. The fault condition causes an error in the message signals on the cable pairs which may occur as either a loss of synchronization at circuit 24, a loss of high frequency pulses in the signal coming into circuit 24 or a bipolar violation appearing in the signal coming into circuit 24. Loss of synchronization is detected by circuit 24 in the same manner in which either terminal 14 or 16 detects a failure to synchronize on the signal received by that terminal. The loss of high frequency pulses is an indication that the clock signal used for bit timing in the message is no longer contained therein. A bipolar violation is a indication that within a predetermined time a predetermined number of successive one bits in the message signal do not alternate in polarity. The predetermined number of violations and the predetermined time are chosen as functions of the error specification of the particular system in which loopback circuit 24 is located. The operation of loopback circuit 24 will now be described in detail with reference to the block schematic diagram shown in FIG. 10.

Circuit 24 is connected to cable pair 20 at point 20a to receive the signal on the cable pair at that point. In both its normal and loopback modes of operation circuit 24 always has its input connected to point 20a. As will be described hereinafter circuit 24 in its normal mode of operation monitors the signal at point 20a for the occurrence of one of the errors described above. If the signal does not contain any of the errors circuit 24 will remain in its normal mode and the input to terminal 16 is connected to point 20a. Upon detection of an error in the signal circuit 24 operates a switch 216 to connect the input of terminal 16 to cable pair 18 at point 18a. The input to circuit 24, however, always remains connected to point 20a.

The loopback circuitry looks for a predetermined number of bipolar violations occurring within a predetermined time period. This time period is referred to as the error period. Circuit 200 sets a time window which is equivalent to a predetermined number of frames of the message signal in which to look for bipolar violations. Error period circuitry 200 may for example consist of one or more counters which are used to count the number of odd frame sync pulses contained in the message signal on the transmission line. These odd frame sync pulses are detected by the combination of clock recovery circuit 206 and frame sync circuit 208. As described previously for the circuit shown in FIG. 3, the clock recovery circuit recovers from the message signal on the transmission line the clock signal and the frame sync circuit operates in conjunction therewith to determine the odd frame sync pulse for the purposes of synchronization. Clock recovery circuit 206 and frame sync circuit 208 are substantially identical in structure and function to circuits 36 and 46 respectively (shown in FIG. 3) and therefore need not be described further.

Thus, error period circuit 200 sets a time period to look for bipolar violations which period is equivalent to a predetermined number of frames and circuit 200 counts these frames by counting the number of odd sync pulses found by circuit 208.

Circuit 202 which may, for example, consist of a suitably arranged counter as well as other components to be described hereinafter counts the number of bipolar violations which are detected by circuit 204. The counter contained in circuit 202 is enabled at the beginning of each error period or window set by circuit 200. The counter may for example count the number of bipolar violations as the difference between the actual count of the counter up to its maximum value and some predetermined count to which the counter is set at beginning of each window. By changing the predetermined count in the counter the number of bipolar violations that are needed to fill the counter during any window may be varied.

Circuit 204 looks at the message signal on the transmission line to determine if the one bits contained therein alternate in polarity. Circuit 204 may, for example, consist of suitably arranged multiple flip-flops wherein the D input of one of the flip-flops are those transmission line pulses of positive polarity, the D input of the other of the flip-flops are those transmission pulses of negative polarity and the common clock input to both of the flip-flops is connected to the signal on the transmission line. Suitably arranged AND gates connected to the output of the multiple flip-flop are therefore capable of detecting bipolar violations. The output of the bipolar violation detector is connected to the input of the counter in circuit 202.

During the window set by circuit 200 the counter in circuit 202 counts the number of bipolar violations detected by circuit 204. The counter in circuit 202 overflows when circuit 204 detects within the window set by circuit 200 the predetermined number of violations. Upon overflowing the counter in circuit 202 sets a suitably arranged latch also included in circuit 202. The setting of the latch indicates that the predetermined number of bipolar violations have been detected in the error period. If detector 204 does not detect the predetermined number of violations within the error period the counter is reset to its initial count at the beginning of the next period. Thus circuit 202 counts the number of bipolar violations detected within a predetermined time period and if these violations exceed a predetermined number a latch is set.

The output of circuit 202 is connected as one input to restoral timing circuit 212. For bipolar violations, circuit 212 includes a suitably arranged timing circuit which must be timed out before loopback occurs. The bipolar violation timing of circuit 212 is set in a manner such that the predetermined number of bipolar violations counted by circuit 202 must occur for a predetermined number of the windows set by circuit 200 before loopback occurs. The predetermined number of bipolar violations counted by circuit 202, the window set by circuit 200 and the time set by circuit 212 which must lapse before loopback occurs are determined as a function of the particular systems error specifications.

In a system wherein the messages transmitted on the transmission line represent voice signals, a substantial number of bipolar violations occurring over a considerable period of time may be tolerated by the subscriber. On the other hand where the message signals transmitted on the transmission line contain data then only a small number of bipolar violations occurring over a very short period of time can be tolerated by the systems user. For example, in a system of the type being described herein wherein voice service is provided to telephone subscribers, the window of circuit 200 has been set at 64 frames of the message signal, the predetermined of bipolar violations counted by circuit 202 within that window has been set at 14 and the time set by circuit 212 has been set at about the time equivalent to 60 windows. Thus, in that system at least a minimum of 14 bipolar violations must occur for each of about 60 windows before loopback occurs.

Upon the timing out of the time in circuit 212 associated with the bipolar violations an output signal is sent to switch and control circuit 214. Upon receipt of this signal, control circuit 214 closes a suitably arranged switch 216 which may for example be a relay to thereby connect the input to terminal 16 to point 18a. The transmission line is therefore looped back at the point where circuit 24 is located. Control circuit 214 may for example be a suitably arranged transistor which upon changing its state of operation causes the operation of switch 216.

Once loopback has occurred, it is desirable to reprogram the counter which is contained in circuit 202 to maintain the switch closed as long as a predetermined minimum number of bipolar violations occur. This reprogramming of the counter provides a form of digital hysterisis which keeps the loopback circuit from oscillating between a switch closed and switch open condition. The counter is reprogrammed by pre-setting the counter to a count which is close to the maximum count that the counter can count. For example, where the system being described herein is servicing telephone subscribers it has been found convenient to re-program the counter upon the closing of the switch so that one or more bipolar violations occurring in the window established by circuit 200 maintains the loopback condition. When the cable fault condition is corrected the number of bipolar violations detected by circuit 24 falls below the predetermined minimum and switch 216 is operated to reconnect the input of terminal 16 to point 200.

As described above, the loopback circuitry includes clock recovery circuit 206 and frame synchronization circuit 208. Also included is a divide by 193 circuit 210 which is a simplified version of the divide by 193 circuit 38 described in connection with FIG. 3. The loopback circuitry also looks for other errors in the signal on the transmission line at point 20a such as either the loss of frame synchronization or the loss of high frequency pulses. Upon the occurrence of either of these errors in addition to the bipolar violation condition described above switch 216 is operated to connect the input to terminal 16 to point 18a to thereby loopback the system at this point. The principle difference in the occurrence of loopback for loss of synchronization or loss of high frequency pulses as compared to the bipolar violation is the time set by restoral timing circuit 212 before the switch is closed. For example, upon the detection of loss of synchronization by circuit 208 a time constant associated with that fault condition is established by circuit 212. This time constant is however significantly longer than the time constant described in connection with FIG. 3 for the occurrence of bypass at the subscriber terminal upon the determination of a loss of synchronization condition. Circuit 212 also establishes a different time constant upon the occurrence of loss of high frequency pulses. Thus circuit 212 establishes separate time constants for each of the signal errors looked at by the loopback circuitry.

When the cable fault condition which gave rise to the error in the signal at point 20a is corrected circuit 24 will operate switch 216 to reconnect the input of terminal 16 to point 20a. If the loopingback resulted from the loss of high frequency pulses in the signal at point 20a then upon correction of the cable fault condition the high frequency will appear at the input to circuit 24. Clock recovery circuit 206 will then be able to recover the clock signal and switch 216 will be operated to reconnect the input of terminal 16 to point 20a. If the loopingback resulted from the inability of circuit 24 to synchronize on the signal present at point 200 then upon correction of the fault condition frame sync circuit 208 will be able to synchronize on the signal. Switch 216 will then be operated to reconnect the input of terminal 16 to point 20a.

While the system 10 being described herein has been shown in FIG. 1 with a subscriber terminal 14 and a single drop terminal 16 it should be appreciated that this system may also include additional drop terminals. Where the system includes additional drop terminals loopback circuitry similar to that described above is located adjacent to each of those terminals to provide loopback upon the determination of one or more of the fault conditions. It should be appreciated though, that where a drop terminal is located further from the central office the time for loopback to occur upon the determination of the fault condition of loss of synchronization or loss of high frequency data should be less than for those terminals located closer to the central office. The reason for this difference in time constants is to insure an orderly looping back of the system. For example, in a system wherein voice messages are being transmitted to subscribers' telephones and where there are two drop terminals located between the central office and the subscriber terminal a typical time for loopback to occur at the furthest drop terminal upon the determination of either loss of synchronization or loss of high frequency data has been established as 300 msec and 15 msec respectively, whereas for the closer in terminal the time for loopback to occur for these conditions has been established as 600 msec and 30 msec, respectively.

Figure 11:
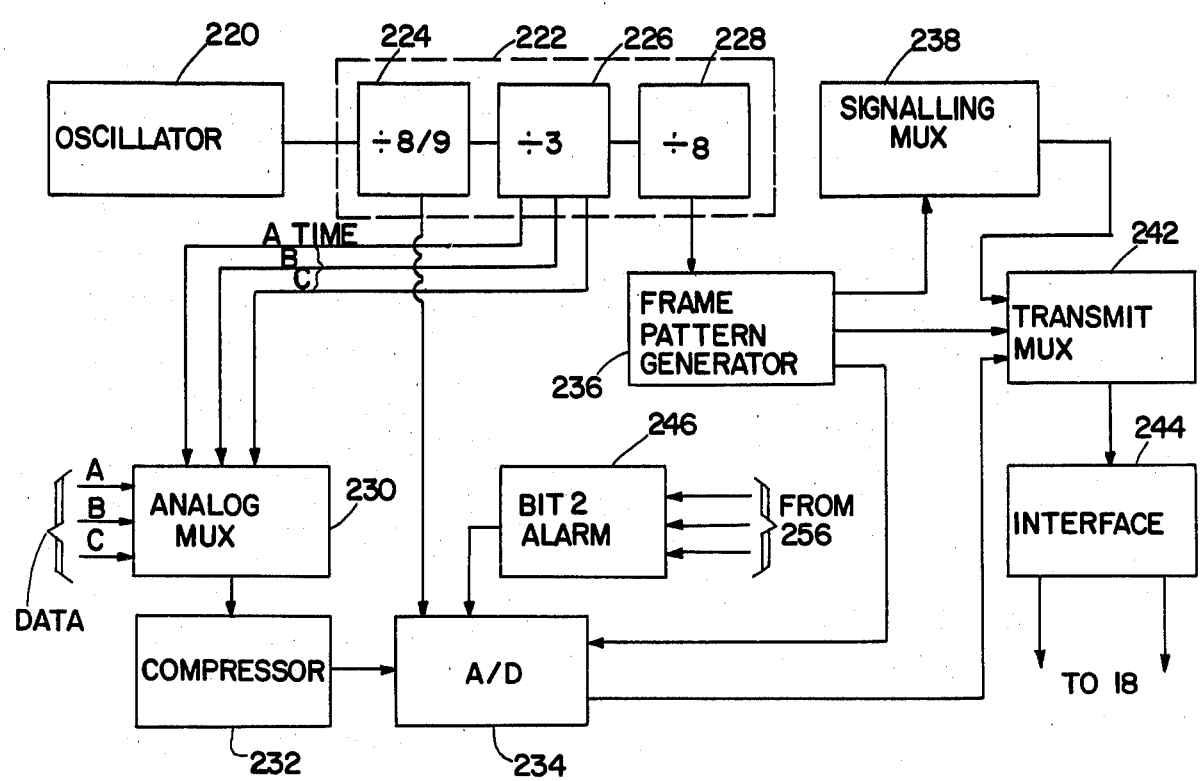
FIG. 11 is a block diagram showing the transmitter section included in the central office of the system shown in FIG. 1.

Referring to FIG. 11 there is shown a block diagram of the transmitter portion of central office 12. The transmitter converts the analog message signals received at the central office for the subscribers of system 10 into the digital signal for transmission to those subscribers. The transmitter also supplies the master clock for system 10 which is recovered by both terminals 14 and 16 and used therein as described previously.

The master clock is generated by oscillator 220 which for example can be a conventional crystal which oscillates at the frequency of $1.544 \times 10^6$ Hz. The output of the oscillator is used by divide by 193 circuit 222 which provides the timing for each group of eight bits comprising each channel, the particular group of eight channels to which each channel belongs and the timing for a group of 24 channels (a frame). Circuit 222 includes divide by 8/9 circuit 224, divide by 3 circuit 226 and divide by 8 circuit 228. As each of circuits 222, 226, 228 are structurally identical to circuits 40, 42 and 44 comprising divide by 193 circuit 38 of FIG. 3 which was described in detail in connection with FIG. 4b no further description of circuit 222 is needed.

Divide by 8/9 circuit 224 provides the bit timing for each of the eight bits comprising each channel as well as the additional bit time for the sync bit to A/D converter circuit 234. Divide by 3 circuit 226 provides the timing which identifies in which particular group A, B or C of eight channels a particular channels lies to analog multiplexer 230. Multiplexer 230 also receives analog data to be transmitted from the central office to each of the A, B and C groups of channels. Multiplexer 230 functions in a manner substantially identical to that described previously for analog multiplexer 138 located in the transmitter portions of terminals 14 or 16 and therefore need not be described further. The output of multiplexer 230 is a time multiplexed analog signal which is provided to the input of compressor 232.

Compressor 232 and A/D converter 234 function as described previously for FIG. 6 to first compress the uncompressed analog signal and then convert the compressed analog signal into a digital signal at the output of converter 234. The output signal from converter 234 is in the $D_3$ format and therefore there is included in circuit 234 a suitably arranged circuit such as that described previously for FIG. 6 to convert the signal from the offset binary format to the D3 format. Compressor 232 and converter 234 may be any one of the types of compressors and convertors described previously for FIG. 6.

Divide by 192 circuit 222 provides that signal which defines the sync bit time for each frame to divide by 12 circuit frame pattern generator 236. Circuit 236 provides the timing for the superframe which time is equivalent to the time between 12 successive sync bits. Circuit 236 may in part be any combination of digital circuit elements which in total performs a division by 12 and may for example be the combination of a divide by three and two divide by two's. The divide by three may be implemented by a suitably arranged Jonhson counter whereas the two divide by two's may be each implemented as two JK flip-flops configured as a two stage ripple counter. The outputs of circuit 236 are used to provide input signals indicating the occurrence of frames 6 and 12 to signalling multiplexer 238; to provide signals for the purpose of frame patterning to transmit multiplexer 242 and a signal indicating the time for frame 1 to converter 234. This last signal is used by converter 234 for the purpose of transmitting to terminals 14 and 16 a signal which is used in the circuitry included in system 10 for determining and indicating alarms. As will be described hereinafter this alarm circuitry is used in conjunction with light emitting diodes at both the central office and terminals 14 and 16 to provide an indication to service personnel of the location of fault condition.

For the digital signal format used in this system the sync bit is high (a one) during frames 1, 5, 6, 8, 9 and 10. Suitably arranged logic gates are included in circuit 236 to decode from the outputs of the counters included therein the times at which the sync bits for each of the frames listed above occur. This timing information is supplied to transmit multiplexer 242 wherein the unity sync bit for the above frames is inserted in those frames prior to transmission of the digital signal on outgoing pair 18. The output timing signals from circuit 236 to signalling multiplexer 238 indicating the time of occurrence of frames 6 and 12 and to converter 234 indicating the time of occurrence of frame 1 may also be obtained by logic gates suitably arranged to decode the outputs of the flip-flops included in circuit 236. Signalling multiplexer 238 utilizes the timing signals received from circuit 236 which indicate the occurrence of frames 6 and 12 to provide the signalling information contained in the signal to be transmitted on cable pair 18. As described previously in connection with FIG. 2 the least significant bit of frames 6 and 12 are used to indicate, respectively, hook switch status and ringing for the corresponding channel. Ringing information is supplied by the central office to the subscriber. The central office portion of system 10 receives the ringing information from that part of a typical telephone central office wherein that information is usually contained. In a typical office an incoming call for a subscriber attached to the office is recognized and a signal is sent to ring the subscribers telephone if it is on hook. For system 10 the typical central office interfaces with the transmit and receives central office portion of system 10 through channel card circuitry located at the office. There are three such channel card circuits one for each group A, B, C of eight subscribers served by the system. These channel card circuits are identical to the channel card circuits located in terminal 14 and 16 and shown in FIG. 5 described previously. In effect system 10 appears to the typical central office in the same manner as if all of the subscribers of system 10 were directly connected to the office by drop loops.

The signalling information contained in the least significant bit of frame 6 for each channel which indicates subscriber hook status is decoded in the receiver portion of office 12 in a manner to be described hereinafter. The hook status signalling information is generated in either terminal 14 or 16 as has been described in connection with FIGS. 5 and 6. The receiver portion of office 12 decodes this hook status information and in effect retransmits it in its proper frame through the operation of signalling multiplexer circuit 238. Thus circuit 238 supplies to transmit multiplexer 242 the signalling information to be placed in the least significant bits of frames 6 and 12 of the signal transmitted from office 12.

Transmit multiplexer 242 serves to multiplex in time the digital signal generated by converter 234 with the signalling bits generated by signalling multiplexer 238. Interface circuit 244 serves to convert the time multiplexer digital signal generated by multiplexer 242 into a bipolar signal. Interface circuit 244 also includes a line driver which couples the output of the bipolar generator to outgoing cable pair 18 through a transformer. Multiplexer 242 functions in a manner substantially identical to multiplexer 146 contained in the transmitter portion of terminals 14 and 16. The transmit multiplexer at the central office may, however, be implemented in simpler circuitry than that shown in FIG. 7 for multiplexer 146. At each terminal multiplexer 146 is required to interleave signals for those subscribers connected to the terminal with signals for those subscribers not connected to the terminal. At the central office all of the signals to be transmitted to the subscribers are available and multiplexer 242 may therefore be implemented as a three input AND gate which receives input signals from frame pattern generator 236, signalling multiplexer 238 and A/D converter 240. The bipolar generator may be implemented in the form described previously in connection with FIG. 7.

Also included in the transmitter portion of central office 12 is alarm logic 246. This circuit receives signals from the receiver portion of the central office and in turn as will be described hereinafter causes bit two of each byte transmitted to a given terminal to be zero if the central office senses an alarm condition in that terminal.

Figure 12:
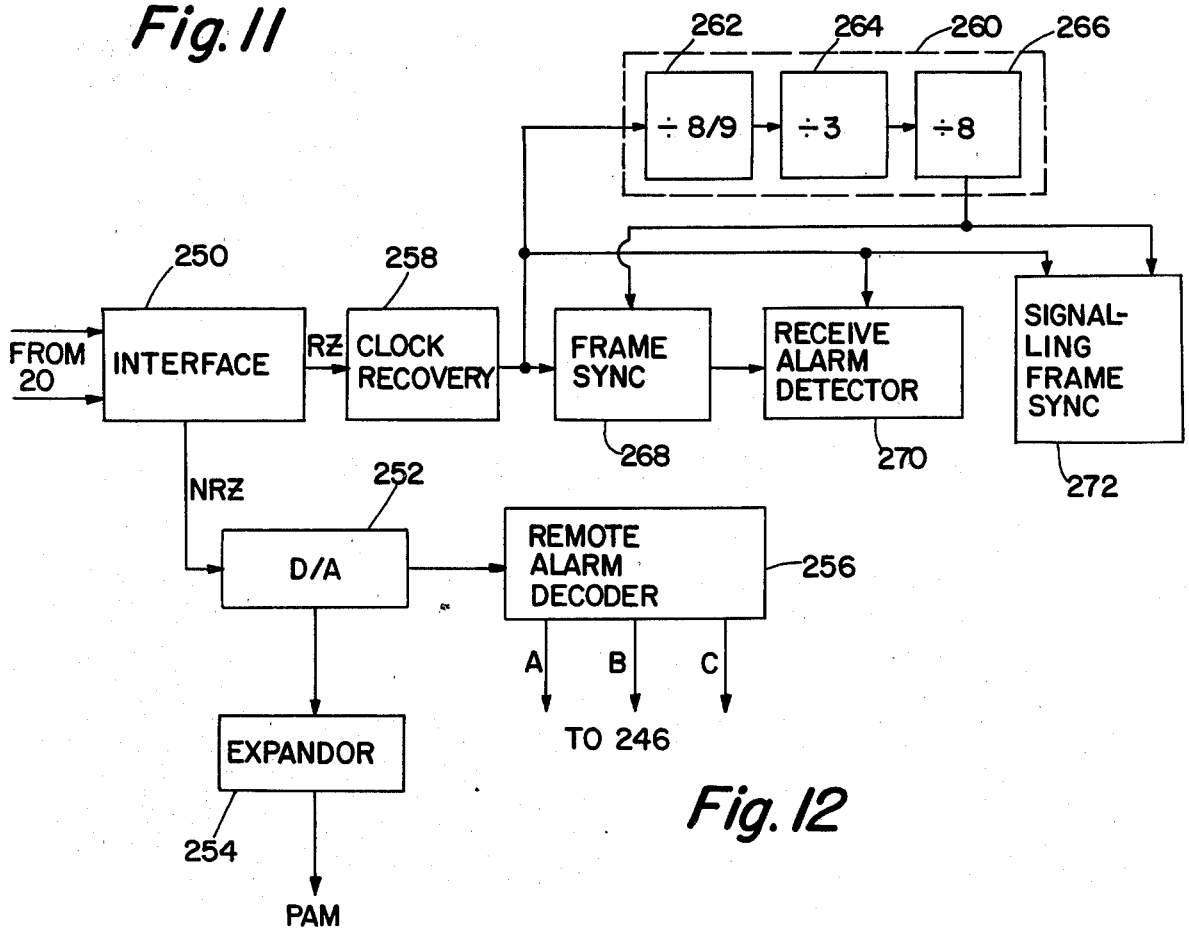
FIG. 12 is a block diagram showing the receiver section included in the central office of the system shown in FIG. 1.

Referring to FIG. 12 there is shown a block diagram of the receiver portion of central office 12. The receiver converts the digital signal received at the central office over incoming cable pair 20 into an analog signal for transmission through the central office channel or interface circuitry to a typical telephone central office. The central office receiver section functions in a manner substantially identical to the receiver located in either terminal 14 or 16. Therefore interface circuit 28, D/A converter circuit 252, expandor circuit 254, clock recovery circuit 258, divide by 193 circuit 260, frame sync circuit 268, receive alarm detector circuit 270 and signalling frame sync circuit 272 are identical in structure and function with the exception noted below to the identically named circuit shown in FIG. 3 and described previously. The exception is in the operation of signalling frame sync circuit 272. Thus only this exception need be discussed further.

At the central office the signalling information contained in the LSB of frame 6 which indicates subscriber hook status is information from the terminal to the central office. The LSB of frame 12 which is ringing information is information which has been transmitted from the central office to the subscriber. Due to the closed loop nature of system 10 this information is returned to the central office. The hook status information is used by the typical central office to either terminate ringing to a called system subscriber or provide a busy signal to the calling party if the called party is already off-hook. The circuitry included in signalling frame sync circuit 272 for decoding the LSB of frames 6 and 12 is however identical to that included in the similarly named circuit in the receiver of either terminal 14 or 16. The only difference is that the central office uses the subscribers hook status to determine if the ringing signal should be sent to the subscriber or if sent be terminated whereas the terminal utilizes the ringing information sent from the central office to ring or not ring the subscribers phone as the case may be.

Also included in the receiver section of the central office is a remote alarm decoder circuit 256. In the transmitter portion of the central office frame pattern generator 236 provided an input signal indicating frame 1 to converter circuit 234. For each of the 24 channels comprising system 10 the central office places a bit of one polarity in the LSB of frame 1. This bit is placed in the signal when the signal is in the offset binary format. On the cable pair 18 this bit may be either a one or a zero as the signal on pair 18 is in the D3 format. At the terminal the receiver reconverts the D3 format to offset binary as described previously. Included in each terminal is circuitry for changing the LSB of received frame 1 on an eight channel basis for those groups of eight channels located at the terminal. When the signal transmitted by the central office is received back at the central office the LSB of frame 1 in the offset binary should be opposite in polarity to the polarity with which it was transmitted. If the LSB of frame 1 for any eight channel group is received back at the central office with the same polarity as it was transmitted this is an indication of an alarm condition for that group of eight channels.

Remote alarm decoder circuit 256 is used to determine if the LSB of frame 1 for each eight channel group is received back at the central office with the same or opposite polarity. If the signal is received back with the same polarity a light emitting diode is lit at the office for the corresponding group of eight. For system 10 there are three such diodes labelled A, B and C at the office. The central office in turn transmits bit two equal to zero for all the channels in the group for which the LSB of frame 1 has been received with the same polarity as it was transmitted. Alarm logic 246 located in the transmitter section of the central office operates in response to the output signals of remote alarm decoder circuit 256 to generate the above bit two condition for all the channels in a group. The lighting of the A, B, or C LED at the central office is an indication that the office is not "hearing" the corresponding group of eight channels. The terminal upon receiving and decoding bit two equals zero for the channels at that terminal lights a corresponding LED labelled CO Alarm.

The central office also includes in its receiver section a receive alarm detector circuit 270. As described previously this circuit is identical to the similarly named circuit included at each terminal. If the central office is unable to synchronize on the signal received on cable pair 20 or is unable to recover the clock from the signal on pair 20 then as happens at the terminal a LED is lit. At both the central office and each terminal this LED is labelled Receive Alarm. Thus the central office includes four LED's which indicate various alarm conditions and the terminals include two LED's which indicate various alarm conditions.

The LED's at the central office and each terminal may be used by a system serviceman to locate a fault condition. A few simple examples should illustrate how these LED's interact with the bypass and loopback circuitry described previously to aid the serviceman in pinpointing the location of a fault condition. Assume for the system shown in FIG. 1 subscriber terminal 14 is bypassed by circuit 22. As described previously the condition causing the bypass may either be a cable fault occurring on the outgoing pair 18 and/or a fault condition at the terminal itself.

As one example assume the fault condition is in the terminal itself (i.e. a failure of the terminal electronics). The terminal is bypassed. The signal on pair 18 was not the cause of the bypassing of terminal 14 and will therefore be received properly by terminal 16. Terminal 16 will operate in its normal mode of operation and the central office will receive a signal on incoming pair 20. The central office will be able to recover the clock from this signal and also synchronize on the received signal. Upon decoding the signal circuit 256 will determine that the LSB for frame 1 for the B and C group of channels is unchanged in polarity. It has been assumed previously that the B and C group are located at terminal 14. The B and C LED's at the office will then be lit. The central office will transmit bit two equals zero for these two groups of channels. As the terminal was bypassed its Receive Alarm LED will be lit. By the lighting of the B and C lights at the central office a serviceman will be directed to look for a fault condition possibly occurring at terminal 14. By checking the LED's at terminal 16 and seeing that they are off the serviceman will be directed to terminal 14. Upon arriving at the terminal the serviceman will see the Receive Alarm LED lit indicating that the fault is located in the terminal.

As a second example assume there is a cable fault condition on the outgoing pair. If terminal 14 receives a signal from pair 18 which contains an error it may not be able to either recover the clock signal or synchronize on the signal. The terminal is then bypassed and its Receive Alarm LED is lit. The terminal will also not change the polarity of the LSB for frame 1 for its two groups of eight channels. As the fault condition is on the cable pair and as terminal 14 was unable to synchronize on the signal received from pair 18, terminal 16 will be unable to synchronize thereon. Terminal 16 will be bypassed by its circuit 22'. Circuit 24 will then by its failure to synchronize connect the input of terminal 16 to pair 18 at point 18a (see FIG. 8).

If the cable fault condition lies between point 18a and the input to terminal 14, terminal 16 will synchronize on the signal from point 18a. The bypass will be removed. The central office receives on pair 20 a signal for which the LSB of frame 1 for the B and C group of channels is unchanged in polarity. The B and C lights at the central office will then be lit. A serviceman sent to correct the fault condition would upon arriving at terminal 16 find its LED's unlit. Circuit 24 has a LED which lights when the circuit switches from its normal to loopback mode of operation. Upon arriving at terminal 14 the serviceman will see the Receive Alarm LED lit. Taken in combination with the lit LED of circuit 24 this indicates a fault condition on outgoing pair 18 at a point between terminals 14 and 16.

If the fault condition had occurred on cable pair 20 at a point between terminals 14 and 16 then terminal 14 would not have been bypassed. Terminal 14 would have been able to synchronize at the signal to its input from pair 18. Terminal 16 would be initially bypassed by circuit 22' and a loopback would also occur by the operation of circuit 24. Upon connecting its input to point 18a terminal 16 would be able to synchronize on its input signal thereby removing the bypass. The B and C LED's would again once be lit at the central office. The LED of circuit 24 would also be lit indicating loopback of the system at point 18a. When the serviceman arrived at terminal 14, he would find its Receive Alarm LED unlit. Its input receives the signal on pair 18. As the fault condition has occurred on pair 20 terminal 14 would be able to synchronize. The CO alarm light at terminal 14 would, however, be lit. The central office upon determining that LSB of frame 1 was not changed in polarity for the B and C group of channels would in all frames make bit two equal to zero for all of the channels in the B and C group. This bit would be decoded by the terminal and the LED would be lit. A serviceman arriving at terminal 14 would then be able to isolate the fault to cable pair 20 between terminals 14 and 16.

It should be appreciated that the above examples are meant to be illustrative of the alarm and fault locating capabilities of system 10. As the system expands to include more drop terminals than those shown in FIG. 1 the number of channel groups may increase. In turn the number of LED's at the central office will also increase. In any event no matter how many drop terminals are included in the system a single serviceman can utilize the LED's at both the central and the terminals to locate the fault condition. It should further be appreciated that upon locating and correcting the fault condition the serviceman by checking the LED's at the terminals or central office has an immediate indication that the correction of the fault has resulted in restoring service to all of the systems subscribers.

Referring to FIG. 13a there is shown a schematic diagram for remote alarm decoder circuit 256 of FIG. 12. As described previously circuit 256 determines if the LSB of frame 1 is received at the central office with a polarity opposite to the polarity it had at the central office transmitter. Each terminal should prior to transmitting change the polarity of that bit for all the channels in each group of eight channels located at that terminal. If the bit is received at the central office with the same polarity as it was transmitted it indicates the occurrence of an error condition for the group or groups and the associated terminal or terminals.

Circuit 256 includes three identical OR gates 280 each of which are in turn connected to three identical analog gates 282. Each OR gates has three inputs. On two of the inputs each gate receives the same signal. More specifically each gate receives an input signal from the decode gates associated with frame sync circuit 268 which indicates the occurrence of frame one in the received signal. Each gate also receives an input signal from receive alarm detector circuit 270 indicating the occurrence of such an alarm at the central office. Finally each gate also receives individually a signal from the decode gates associated with divide by 193 circuit 260 indicating the occurrence of a time slot associated with the A, B or C group of channels.

Each gate included in circuit 280 in turn is connected to an associated one of the three analog gates comprising circuit 282. Each of the analog gates also receives by inverter 284 as an input signal from A/D converter 252 the LSB of the received signal. The OR gate outputs a pulse during either a receive alarm or during the occurrence of frame 1 for its associated group of eight channels. The three analog gates 282 which may for example be implemented by RCA chip type 4016 turns on when the received LSB in frame 1 for the group of eight has the same polarity as the polarity with which it was transmitted from the central office. Connected to the output of each analog gate is an R-C circuit combination (R14-C6; R15-C7; R16-C8) in which the capacitor is charged through the resistor when the associated analog gate turns on. The capacitor C6, C7 or C8 is continuously being discharged by another resistor R17, R18 or R19, respectively. The output of each R-C combination is in turn connected to the inverting input of the associated one of three operational amplifiers 284. When for any group of eight enough of the LSB's are received with the same polarity as they were transmitted the associated capacitor will charge high enough to cause the output of the associated operational amplifier to go low.

Each of the operational amplifiers 284 are in turn connected to an associated light emitting diode D14, D15 or D16. When the op amp output goes low the associated LED is turned on thereby indicating either an A, B or C alarm as described above. More specifically D14 indicates a B group alarm, D15 indicates an A group alarm and D16 indicates a C group alarm. The inputs to the associated one of the three OR gates 280 are however, respectively, the C, B and A group signals from circuit 260. This apparent analomy arises as a result of the timing associated with the system. An alarm for the A group is detected in time during the occurrence of a channel in the B group. Alarms for the B and C group are detected in time during the occurrence of a channel in the C and A groups, respectively. As described previously the signal on either pair 18 or 20 is encoded with respect to channel groups such that in any frame the channels are arranged in the order $A_1$, $B_1$, $C_1$ $A_2$ . . . $C_8$. Thus by the time the information needed at the central office to detect an alarm condition for a given group has been decoded the central office in time has received a channel in the next adjacent group.

Resistor R22 associated with each of the op amps 284 provides a hysteresis function. Diodes D11, D12 and D13 are used to ensure that the associated LED is turned on in the event of a Receive Alarm at the central office. Such an alarm will exist if the central office is unable to either synchronize on or recover the clock from the signal on incoming pair 20. In that event the office will be unable to determine if the LSB of frame 1 of the received signal is opposite in polarity to the LSB of frame 1 of the transmitted signal.

Representative component values for the elements of circuit 256 constructed in accordance with the present invention are given below:
R14=R15=R16=15.0×10³ ohms
C6=C7=C8=0.02 microfarads
R17=R18=R19=750×10³ ohms
R20=49.9×10³ ohms
R21=1000 ohms
R22=750×10³ ohms
R23=R24=R25=750 ohms Referring to FIG. 13b there is shown a schematic circuit diagram for alarm logic circuit 246 of FIG. 11. Circuit 246 which is located in the transmitter of central office 12 functions to make bit two of the signal to be transmitted from the office for one or more of the groups a zero in all frames when circuit 256 detects an alarm condition for that group. Also shown in FIG. 13b is that circuit used to transmit the LSB for frame 1 with the predetermined polarity and that portion of converter circuit 234 relevant to the discussion to follow.

Converter circuit 234 as described previously may use the successive approximation technique to convert the analog signal to a digital signal. To perform the conversion using the above technique circuit 234 would also include a successive approximation register (SAR) the output of which would be connected to circuit 298. Circuit 298 which comprises eight identical quad comparators is used in combination with pull up resistor circuit 300 which comprises eight identical resistors to convert the level of the output of the SAR. More particularly, circuits 298 and 300 may function to convert TTL levels to +6 V CMOS logic levels. The outputs signals from circuit 300 are connected as inputs to parallel to serial shift register 302 which is clocked by the master clock at the 1.544 MHz rate. Register 302 converts the parallel input signal into a serial output signal which after conversion from an offset binary format to a sign plus magnitude format is transmitted from the central office on outgoing pair 18. It should be appreciated that the eight bit signal in circuits 298 and 300 are in the offset binary format.

AND gate 304 whose inputs are connected to various ones of the counters comprising frame pattern generator circuits 236 is used to decode the time of occurrence of frame 1. Gate 304 is connected by diode D21 to that one of the resistors of circuit 300 which is associated with the LSB. This connection insures that for frame 1 the LSB will have a predetermined polarity in the offset binary format.

Two input OR gates 290, 292 and 294 receive on one of their inputs the A, B and C alarm signals respectively generated by circuit 256. Each gate also receives on the other of its inputs from circuit 228 a signal which is used to indicate the time of occurrence of a channel in one of the three groups. In particular gate 290 receive a signal indicating the occurrence of a C group channel, gate 292 an A group channel and gate 294 a B group channel. Gate 290 is however used to control the setting of bit two equal to zero for the channels in the A group. Because of timing considerations it is necessary for this function to be initiated during the time of occurrence of a channel in the C group. Similar considerations relate to gates 292 and 294 which are used to control the setting of bit two equal to zero for the B and C group of channels, respectively.

The output of gates 290 to 294 are connected by gate 296 to circuit 314 which is used to set bit two equal to zero in the transmitted signal. It is desired that bit two be equal to zero in the sign plus magnitude format. Circuit 314 is however connected as input to register 302 which has a signal input in the offset binary format. To ensure that bit two will be equal to zero in the sign plus magnitude format circuit 314 looks at the MSB (bit 1) and for the alarm condition makes bit 2 equal to the MSB. This equality of bit 1 and bit 2 results in bit two being equal to zero in the sign plus magnitude format regardless of the sign of the MSB in the offset binary format.

Circuit 314 includes four AND gates 306, 308, 310 and 312. Gate 306 has one of its inputs connected to the output of gate 296. Gate 308 has one of its inputs connected to the output of gate 306 and the other input connected to the output of the quad comparator in circuit 298 which is associated with the MSB. Gate 310 has one input connected to the output of the quad comparator in circuit 298 associated with the bit adjacent to the MSB and has its other input connected to receive the output of gate 296. Gate 312 has two inputs one of which is connected to the output of gate 308 and the other of which is connected to the output of gate 310. The output of gate 312 is in turn connected to shift register 312 to thereby make during an alarm condition bit 2 equal in sign to the MSB.

Referring to FIG. 13c there is shown a schematic diagram for the circuit 34 of FIG. 3 located in the receiver section of terminals 14 and 16 for decoding bit two equal to zero. Exclusive OR gate 320 decodes from the output of the serial to parallel shift register contained in converter circuit 30 the bit two equals zero condition. This condition is decoded by in effect comparing the MSB and bit 2 of the received signal after it has been converted to offset binary format. To transmit bit two equal to zero circuit 246 made bit two and the MSB equal in sign in the offset binary format. Gate 320 looks for this equality.

The output of gate 320 is in turn connected to one input of comparator 322 which for example be implemented by RCA chip type 4016. The other input to comparator 322 is connected to receive a clocked signal which indicates the presence of either the A, B or C groups of channels at the terminal or any combination thereof. This indication comes from switches which are set at the terminal. For system 10 the B and C switches are set at subscriber terminal 14 and the A switch is set at drop terminal 16. It should be appreciated that it is the set condition of the switches which are compared at circuit 322 and not the actual presence of the group channel circuits shown in FIG. 5. One or all of the group channel cards at a terminal may be removed yet the circuit being described herein will function as long as the appropriate switches are set.

Comparator 322 outputs a pulse for each channel in a group for which bit two equals zero. These pulses are used to discharge capacitor C9 by resistor R30. After about two frames of bit two equals zero for all the channels in the group or groups located at the terminal, operational amplifier 324 turns on to thereby light CO alarm LED D22. For every channel in the group or groups for which bit two is equal to a one capacitor C9 is charged by the parallel combination of resistors R39 and R40. After about eight channel times the capacitor will have charged sufficiently to turn off D22. Diode D23 connected between amplifier 324 and diode D22 is used during the occurrence of a CO alarm to send a signal to the group channel circuitry to thereby mute all channels.

Figure 13D:
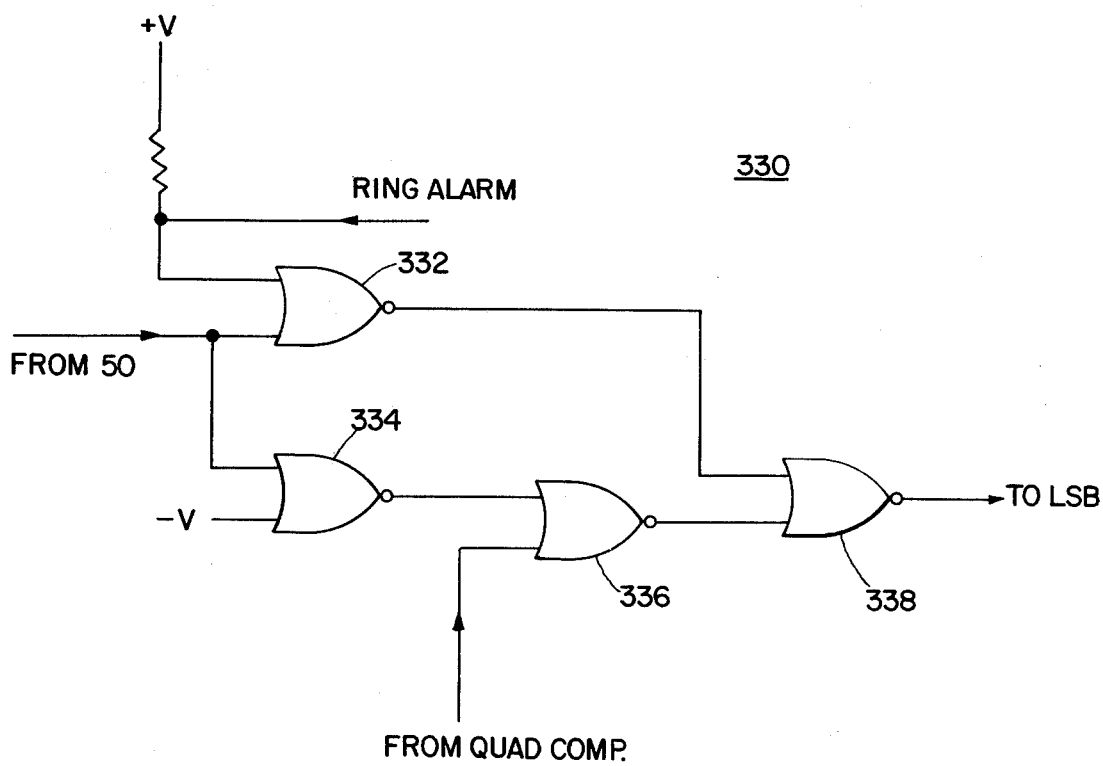

Representative component values for the elements of circuit 34 constructed in accordance with the present invention are given below:

R28 = $255 \times 10^3$ ohms
R29 = 1500 ohms
R30 = $15 \times 10^3$ ohms
C9 = 0.02 microfarads
R31 = 750 ohms
R32 = $49.9 \times 10^3$ ohms As described above circuit 256 located in the central office checks the returning polarity of the LSB for frame 1 to determine if the bit has the same or opposite polarity as compared to the polarity with which it was transmitted. If a sufficient number of LSB's for a given channel group are received with the same polarity then a corresponding LED is lit at the central office. For those channel groups located at either terminal 14 or 16, the LSB of frame 1 is transmitted under normal conditions with a polarity in the off set binary format which is opposite the polarity it was transmitted with from the central office. The circuitry to accomplish this change and also to insure that for the failure condition described below the LSB is transmitted with the same polarity as it is received is shown in FIG. 13d.

There is one condition where it would be desirable for terminal 14 or 16 to make certain that the LSB of frame 1 is received by the central office with the same polarity as it was transmitted. This condition exists when the generator contained in the power circuitry at the terminal for ringing the subscribers telephone has failed. Circuit 330 which is comprised of OR gates 332, 334, 336 and 338 receives an input signal from the quad comparators included in converter 142 and outputs a signal to the input of the parallel to serial shift register included in the converter which corresponds to the LSB (offset binary format). Circuit 330 also receives an input signal from the power circuitry (not shown) included in the terminal indicating failure of the ringing generator and an input signal from frame sync circuit 46 which indicates the occurrence of frame 1.

More specifically, OR gate 332 has one input connected to receive the alarm signal indicating ringing generator failure. The other input of gate 332 as well as one input of gate 334 receives the signal indicating the occurrence of frame 1. Gate 334 has its output connected to one input of two input OR gate 336. Gate 336 has its other input connected to receive the output signal of the quad comparator associated with the LSB. The output of gate 336 is in turn connected to one of the inputs of two input gate 338. Gate 338 has its other input connected to receive the output of gate 332 and the output of gate 338 is connected to the input of the serial to parallel shift register associated with the LSB. Therefore under normal conditions circuit 330 insures that the LSB in the offset formula has a polarity opposite to that which it had when transmitted from the central office. Circuit 330 also insures that for a ringing generator failure at the terminal the LSB of frame 1 is transmitted with the same polarity as it had when it was transmitted from the central office.

As described previously other terminal fault conditions such as failure to synchronize on the received signal cause the terminal to bypass. When the terminal is bypassed the signal from the central office is transmitted unchanged. Thus for the bypassed terminal the central office will receive a signal having an LSB in frame 1 which has the polarity as it had when transmitted.

It should be appreciated that while system 10 has been described in connection with a drop terminal located on the incoming cable pair 20 the use of the present invention to drop and insert terminals is not restricted to the incoming cable pair. Drop terminals may also be located on the outgoing cable pair. Additionally the number of terminals dropped at any one location may be any number (even one) and is not restricted to the eight channel drops described in connection with system 10. It should further be appreciated that the loopback circuitry of the present invention and described in connection with system 10 functions in the manner described only when the drop terminals are connected on the incoming cable pair. It should also be appreciated that the subscriber terminal constructed in accordance with the present invention is a drop terminal which has been located at the furthest extension of cable pairs 18 and 20 from the central office. Because of its location a loopback circuit need not be associated with the subscriber terminal. The subscriber terminal does however include bypass circuitry which is identical to the bypass circuitry included in the drop terminals. It should also be appreciated that the alarm mechanism of the present invention relies for its simplicity on the placement of the drop terminals on the incoming cable pair. This placement allows for both repairs to be made on the system and for service to be maintained to some of the subscribers upon the occurrence of a fault condition without the need for central office supervision.

Finally it should be appreciated that the remote terminals of the present invention have a transmitter section whose clock is slaved to the clock recovered by the receiver section of the terminal from the received signal. The recovered clock is the clock generated by the oscillator located in central office 12. Slaving the terminal clock to the central office clock insures that the bit rate at the terminal is the same as the bit rate at the central office. The terminal also synchronizes on the received signal and in addition generates signals indicating the time of occurrence of each channel in the received signal. The terminal uses the synchronizing signal and the channel occurrence time signal in transmitting the new message signal from the terminal. By so using these signals a fixed time relationship between the occurrence of the channels in the received and transmitted signals arises which relationship does not change each time the terminal resynchronizes.

What is claimed is:

1. A drop terminal for serving at least one subscriber of a multi-channel digital subscriber carrier system, said system including a central office for transmitting over a first transmission means messages to said system subscribers and for receiving over a second transmission means messages from said subscribers and an oscillator for generating a clock signal having a predetermined frequency, said terminal being connected to one of said transmission means at a location external to said central office said terminal receiving from said transmission means a periodic first digital message signal having a transmission frequency equal to said clock frequency and a multiplicity of channel times each associated with a respective one of said subscribers said channels occurring in said signal in a predetermined time sequence at least one of said channel times having an encoded message signal for said at least one drop terminal subscriber, said terminal transmitting on said transmission means a periodic second digital message signal having said transmission frequency and said multiplicity of channels times occurring in said predetermined time sequence said channel associated with said at least one drop terminal subscriber having an encoded message from said subscriber said second signal having a fixed time relationship to said first signal said terminal comprising:

(a) means for receiving said first signal including:
  (i) means responsive to said first signal for recovering said clock signal therefrom;
  (ii) means responsive to said recovered clock signal and said first signal for identifying said predetermined time of occurrence of each of said channels and for synchronizing on said period of said first signal said means generating two signals one of which identifies said channel time of occurrence and the other of which is indicative of said synchronization;
  (iii) means responsive to said first signal for decoding all of said messages encoded therein; and
  (iv) means responsive to said decoded message signals, said channel identifying signal and said synchronizing signal for providing said at least one drop terminal subscriber with its message; and (b) means for transmitting said second signal including:
  (i) means responsive to said recovered clock, said channel identifying signal, said synchronizing signal and said message from said at least one subscriber at said terminal for inserting said message in said channel time associated with said subscriber and for encoding said inserted message said means generating a periodic digital signal having said transmission frequency and said multiplicity of channels occurring in said predetermined time sequence; and
  (ii) means responsive to said signal generated by said inserting and encoding means and said first signal for digitally multiplexing said encoded signal and said first signal to thereby generate said second digital signal.

2. A multi-channel digital subscriber carrier system for serving a multiplicity of subscribers remote from a central office said system comprising:

(a) a first transmission means connected to said central office, said office transmitting messages to said system subscribers over said means;

(b) a second transmission means connected to said central office, said office receiving messages from said system subscribers over said means;

(c) a subscriber terminal for serving at least one of said subscribers;

(d) oscillator means located in said central office for generating a clock signal having a predetermined frequency; and (e) a drop terminal for serving at least a different one of said subscribers said terminal being connected to one of said transmission means at a location between said office and said subscriber terminal, said drop terminal receiving from said transmission means a periodic first digital message signal having a transmission frequency equal to said clock frequency and a multiplicity of channel times each associated with a respective one of said system subscribers said channels occurring in said signal in a predetermined time sequence at least one of said channel times having an encoded message for said at least one different drop terminal subscriber said terminal transmitting on said transmission means a periodic second digital message signal having said transmission frequency and said multiplicity of channel times occurring in said time sequence said channel associated with said at least one different drop terminal subscriber having an encoded message from said subscriber said second signal having a fixed time relationship to said first signal said drop terminal having means for receiving means said first signal and means for transmitting said second signal said receiving means including:
  (i) means responsive to said first signal for recovering said clock signal therefrom;
  (ii) means responsive to said recovered clock signal and said first signal for identifying said predetermined time of occurrence of each of said channels and for synchronizing on said period of said first signal said means generating two signals one of which identifies said channel time of occurrence and the other of which is indicative of said synchronization;
  (iii) means responsive to said first signal for decoding all of said messages encoded therein; and
  (iv) means responsive to said decoded message signals, said channel identifying signal and said synchronizing signal for providing said at least one drop terminal subscriber with its message; and (f) said transmitting means including:
  (i) means responsive to said recovered clock, said channel identifying signal, said synchronizing signal and said message from said at least one subscriber at said terminal for inserting said message in said channel time associated with said subscriber and for encoding said inserted message said means generating a periodic digital signal having same transmission frequency and said multiplicity of channels occurring in said predetermined time sequence; and
  (ii) means responsive to said signal generated by said inserting and encoding means and said first signal for digitally multiplexing said encoded signal and said first signal to thereby generate said second digital signal.

3. The system of claim 2 wherein said drop terminal is connected to said first transmission means.

4. The system of claim 3 wherein said subscriber terminal has a receiver means and a transmitter means said receiver means being connected to said first transmission means for receiving said second signal transmitted by said drop terminal, said transmitter means being connected to second transmission means and generating a third periodic digital message signal to said central office.

5. The system of claim 4 wherein said first signal received by said drop terminal includes in at least another one channel time associated with said subscriber terminal subscriber an encoded message for said subscriber said receiver means in said subscriber terminal including:

(a) means responsive to said second signal for recovering said clock signal therefrom;

(b) means responsive to said recovered clock signal and said second signal for identifying said predetermined time of occurrence of each of said channels and for synchronizing on said period of said second signal said means generating two signals one of which identifies said channel time of occurrence and the other of which is indicative of said synchronization;

(c) means responsive to said second signal for decoding all of said messages encoded therein; and (d) means responsive to said decoded message signals, said channel identifying signal and said synchronizing signal for providing said at least one subscriber terminal subscriber with its message.

6. The system of claim 5 wherein said transmitter means of said subscriber terminal includes:

(a) means responsive to said recovered clock, said channel identifying signal, said synchronizing signal and said message from said at least one subscriber at said terminal for inserting said message in said channel time associated with said subscriber and for encoding said inserted message said means generating a periodic digital signal having said transmission frequency and said multiplicity of channels occurring in said predetermined time sequence; and (b) means responsive to said signal generated by said inserting and encoding means and said second signal for digitally multiplexing said encoded signal and said second signal to thereby generate said third digital signal.

7. The system of claim 2 wherein said drop terminal is connected to said second transmission means.

8. The system of claim 7 wherein said subscriber terminal has a receiver means and a transmitter means said receiver means being connected to said first transmission means to receive a third periodic digital message signal from said central office said third signal having a transmission frequency equal to said clock frequency and a multiplicity of channel times each associated with a respective one of said system subscribers said channels occurring in said third signal in a predetermined time sequence at least one of said channel times having an encoded message signal for said at least one different drop terminal subscriber and at least another one of said channel times having an encoded message signal for said at least one subscriber served by said subscriber terminal, said transmitter means being connected to second transmission means and generating said first periodic digital message signal to said drop terminal.

9. The system of claim 8 wherein said receiver means in said subscriber terminal includes:

(a) means responsive to said third signal for recovering said clock signal therefrom;

(b) means responsive to said recovered clock signal and said third signal for identifying said predetermined time of occurrence of each of said channels and for synchronizing on said period of said third signal said means generating two signals one of which identifies said channel time of occurrence and the other of which is indicative of said synchronization;

(c) means responsive to said third signal for decoding all of said messages encoded therein; and (d) means responsive to said decoded message signals, said channel identifying signal and said synchronizing signal for providing said at least one subscriber terminal subscriber with its message.

10. The system of claim 5 wherein said transmitter means of said subscriber terminal includes:

(a) means responsive to said recovered clock, said channel identifying signal, said synchronizing signal and said message from said at least one subscriber at said terminal for inserting said message in said channel time associated with said subscriber and for encoding said inserted message said means generating a periodic digital signal having said transmission frequency and said multiplicity of channels occurring in said predetermined time sequence; and (b) means responsive to said signal generated by said inserting and encoding means and said first signal for digitally multiplexing said encoded signal and said first signal to thereby generate said second digital signal.

11. A multi-channel digital subscriber carrier system for serving a multiplicity of subscribers remote from a central office said system comprising:

(a) an outward transmission line connected to said central office, said office transmitting messages to said system subscribers over said line;

(b) an inward transmission line connected to said central office, said office receiving messages from said system subscribers over said line;

(c) a subscriber terminal for serving at least one of said subscribers;

(d) oscillator means located in said central office for generating a clock signal having a predetermined frequency; and (e) a drop terminal for serviing at least a different one of said subscribers said terminal being connected to said outward transmission line at a location between said office and said subscriber terminal, said drop terminal receiving from said transmission line a periodic first digital message signal having a transmission frequency equal to said clock frequency and a multiplicity of channel times each associated with a respective one of said system subscribers said channels occurring in said signal in a predetermined time sequence at least one of said channel times having an encoded message for said at least one different drop terminal subscriber said terminal transmitting on said outward transmission line a periodic second digital message signal having said transmission frequency and said multiplicity of channel times occurring in said time sequence said channel associated with said at least one different drop terminal subscriber having an encoded message from said subscriber said second signal having a fixed time relationship to said first signal said drop terminal having means for receiving means said first signal and means for transmitting said second signal said receiving means including:

(i) means responsive to said first signal for recovering said clock signal therefrom;

(ii) means responsive to said recovered clock signal and said first signal for identifying said predetermined time of occurrence of each of said channels and for synchronizing on said period of said first signal said means generating two signals one of which identifies said channel time of occurrence and the other of which is indicative of said synchronization;

(iii) means responsive to said first signal for decoding all of said messages encoded therein; and (iv) means responsive to said decoded message signals, said channel identifying signal and said synchronizing signal for providing said at least one drop terminal subscriber with its message; and (f) said transmitting means including:

(i) means responsive to said recovered clock, said channel identifying signal, said synchronizing signal and said message from said at least one subscriber at said terminal for inserting said message in said channel time associated with said subscriber and for encoding said inserted message said means generating a periodic digital signal having said transmission frequency and said multiplicity of channels occurring in said predetermined time sequence; and (ii) means responsive to said signal generated by said inserting and encoding means and said first signal for digitally multiplexing said encoded signal and said first signal to thereby generate said second digital signal.

12. A multi-channel digital subscriber carrier system for serving a multiplicity of subscribers remote from a central office said system comprising:

(a) an outward transmission line connected to said central office, said office transmitting messages to said system subscribers over said line;

(b) an inward transmission line connected to said central office, said office receiving messages from said system subscribers over said line;

(c) a subscriber terminal for serving at least one of said subscribers;

(d) oscillator means located in said central office for generating a clock signal having a predetermined frequency; and (e) a drop terminal for serving at least a different one of said subscribers said terminal being connected to said inward transmission line at a location between said office and said subscriber terminal, said drop terminal receiving from said transmission line a periodic first digital message signal having a transmission frequency equal to said clock frequency and a multiplicity of channel times each associated with a respective one of said system subscribers said channels occurring in said signal in a predetermined time sequence at least one of said channel times having an encoded message for said at least one different drop terminal subscriber said terminal transmitting on said onward transmission line a periodic second digital message signal having said transmission frequency and said multiplicity of channel times occurring in said time sequence said channel associated with said at least one different drop terminal subscriber having an encoded message from said subscriber said second signal having a fixed time relationship to said first signal said drop terminal having means for receiving said first signal and means for transmitting said second signal said receiving means including:

(i) means responsive to said first signal for recovering said clock signal therefrom;

(ii) means responsive to said recovered clock signal and said first signal for identifying said predetermined time of occurrence of each of said channels and for synchronizing on said period of said first signal said means generating two signals one of which identifies said channel time of occurrence and the other of which is indicative of said synchronization;

(iii) means responsive to said first signal for decoding all of said messages encoded therein; and (iv) means responsive to said decoded message signals, said channel identifying signal and said synchronizing signal for providing said at least one drop terminal subscriber with its message; and (f) said transmitting means including:

(i) means responsive to said recovered clock, said channel identifying signal, said synchronizing signal and said message from said at least one subscriber at said terminal for inserting said message in said channel time associated with said subscriber and for encoding said inserted message said means generating a periodic digital signal having said transmission frequency and said multiplicity of channels occurring in said predetermined time sequence; and (ii) means responsive to said signal generated by said inserting and encoding means and said first signal for digitally multiplexing said encoded signal and said first signal to thereby generate said second digital signal.

13. The system of claim 12 wherein said drop terminal has an input connected to said receiver means and said system includes loopback means located between said subscriber terminal and said input said loopback means normally connecting said input to said inward line and upon the occurrence of at least one of a predetermined number of fault conditions in said first digital signal said loopback means disconnecting said normal connection and connecting said input to said outward line.

14. The system of claim 13 wherein said loopback means includes:

(a) means responsive to said first digital signal for determining the occurrence of at least one of said predetermined number of said fault conditions and generating a signal upon said occurrence; and (b) switching means connected between said inward and outward lines and said input responsive to said fault occurrence signal for providing said connection between said input and said outward line said switching means providing said normal connection when said fault occurrence means does not generate a signal.

15. The system of claim 14 wherein said subscriber terminal has an input connected to said outward line and an output connected to said inward line and said terminal includes receiver means connected between said input and said at least one subscriber and transmitter means connected between said at least one subscriber and said output and bypass means responsive to the occurrence of at least one of a predetermined number of terminal fault conditions for disconnecting said output from said transmitter means and providing a direct electrical connection between said input and said output.

16. The system of claim 13 wherein said drop terminal has an output connected to both said inward line and said transmitter means and includes bypass means for disconnecting said transmitter means from said output upon the occurrence of at least one of a predetermined number of drop terminal fault conditions and providing a direct electrical connection between said input and said output.

17. The system of claim 14 wherein said drop terminal has an output connected to both said inward line and said transmitter means and includes bypass means for disconnecting said transmitter means from said output upon the occurrence of at least one of a predetermined number of drop terminal fault conditions and providing a direct electrical connection between said input and said output.

18. A loopback circuit for a serially looped multichannel digital subscriber carrier system having at least two remote terminals each having an input and an output and at least one system subscriber connected thereto wherein a central office is connected by an outward line directly to said input of the furthest remote of said remote terminals and is connected by an inward line with each of said remote terminals, said central office transmitting a signal having a clock and messages encoded therein for each of said subscribers connected to each of said terminals said loopback circuit located between said furthest remote terminal output and said input of said other terminal, said circuit comprising:

(a) an input always connected to said inward line at said location for receiving said encoded messages signal on said inward line;

(b) first means responsive to said signal for recovering said clock therefrom the failure of said means to recover said clock within a predetermined period of time being indicative of an error in said signal;

(c) second means responsive to said recovered clock and said signal for determining the occurrence in said signal of at least one of a predetermined number of errors other than said clock recovery error has occurred in said signal said means generating a signal indicative of the occurrence of each of said errors, each of said errors having a predetermined time associated therewith;

(d) timing means responsive to said recovered clock and said error indicative signals generated by said second means said timing means having said predetermined time associated with said clock recovery and said predetermined times associated with a respective one of each of said predetermined other errors said timing means generating an error signal whenever any one of any of said errors is present by no later than the end of the associated one of said predetermined times; and (e) switching means having a control connected to receive said timing means error signal said switching means connected between said inward and outward lines and said other input said switching means normally connecting said other input to said inward line in the absence of said timing means error signal said switching means being operated to connect said other input to said outward line when said timing means generates said error signal to thereby disconnect said normal connection and loopback said system at said location.

19. The circuit of claim 18 wherein said second means includes means responsive to said recovered clock and said signal for synchronizing on said signal and one of said predetermined other errors is a failure to accomplish said synchronizing.

20. The circuit of claim 18 wherein said signal is bipolar in nature and said second means includes means responsive to said recovered clock and said signal for determining if said signal has bipolar violations and one of said predetermined other errors is a failure of said signal to be bipolar.

21. The loopback circuit of claim 20 wherein said signal has channel times slots equal in number to the number of channels in said system each of said slots being associated with a respective one of said subscribers, the time for serially transmitting all of said channel time slots being a frame said bipolar violation determining means including means for detecting a predetermined number of bipolar violations occurring in each frame for a predetermined number of said frames, said detecting means generating a bipolar violation signal when said number of violations in each frame is detected for said predetermined number of frames.

22. A bypass circuit adapted for use in the remote terminal of a digital subscriber carrier system, said terminal serving one or more subscribers connected thereto and having an input for receiving a first digital signal having at least encoded messages for said subscribers and an output for transmitting a second digital signal connected thereto said second signal having at least encoded messages from said subscribers, said circuit comprising:

(a) means connected to said terminal and responsive to said first digital signal for detecting the occurrence of an error therein and generating a receive error signal when the occurrence of said error is detected;

(b) switching means connected between said input and said output said switching means being kept energized in a first position in the absence of said receive error signal said switching means not providing in said first position a direct electrical connection between said input and said output; and (c) means for connecting said receive error signal to said switching means said switching means deenergizing to assume a second position in response to the occurrence of said error signal said second position disconnecting said second signal from said output and providing a direct electrical connection between said input and said output said circuit maintaining said connection of said means responsive to said first digital signal to said terminal whereby said terminal is bypassed.

23. The circuit of claim 22 wherein said switching means includes means responsive to a loss of power at said terminal for causing said switching means to change from said first position to said second position thereby bypassing said terminal when said loss of power occurs.

24. The circuit of claim 22 further including means connected to said terminal and responsive to said second digital signal for detecting the occurrence of an error therein and generating a transmit error signal when the occurrence of said error is detected said transmit error signal being connected to said switching means said switching means responsive thereto to assume said second position.

25. The circuit of claim 24 wherein each of said means for detecting an error in said first and second digital signals also generates a signal when the associated one of said errors terminates said switching means responsive to said terminating signal for returning to said first position.

26. A multichannel digital subscriber carrier system comprising:

(a) a central office;

(b) a transmission line extending outward from said central office for carrying a message signal from said office to said system subscribers;

(c) a transmission line extending inward to said central office for carrying a message signal from said system subscribers to said office;

(d) a subscriber terminal having an input connected in said outward line and an output connected to said inward line said terminal serving at least one subscriber of said system said terminal receiving said office message signal from said outward line and recovering therefrom messages for said at least one subscriber served by said terminal said terminal transmitting on said inward line a first digital message signal wherein messages from said at least one subscriber to said central office have been substituted for said recovered messages;

(e) at least one drop terminal having an input and an output connected to said inward line at a location between said central office and said subscriber terminal for serving at least one other subscriber of said system said terminal receiving at said input said first message signal and recovering therefrom messages from said central office for said at least one other subscriber served by said terminal and generating at said output a second message signal wherein messages from said at least one other subscriber to said central office have replaced said recovered message signal; each of said terminals including bypass means connected between said input and said output for effecting a direct electrical connection between said input and said output upon the occurrence of at least one of a predetermined number of fault conditions at said terminal; and (f) loopback means having an input connected to said inward line to receive said first signal and first and second outputs said first output being connected to said drop terminal input, said second output being connected to said outward line said loopback means input being normally connected to said first output said loopback means disconnecting said normal connection and connecting said loopback means input to said second output upon the occurrence of at least one of a predetermined number of transmission line fault conditions at said loopback means.

27. In an N channel digital subscriber carrier system having a central office and at least one remote terminal for serving at least one of said subscribers connected thereto by a transmission medium and in which information signals are transmitted on said medium in a first predetermined format which is divided into a predetermined repetitive number of frames each of which is divided into N channels each having a predetermined number of bits, each of said N channels being associated with a respective one of said subscribers, an alarm system comprising:

(a) central office alarm means including:
  (i) means for identifying when said signal is in a second predetermined format which is related to said first predetermined format a regularly recurring bit in a predetermined one of said frames for at least said channel associated with said at least one subscriber and inserting therein a preselected value; and
  (ii) means responsive to said information signal when said signal is in said second format with said preselected bit value for transmitting said signal in said first format in serial fashion on said medium;

(b) remote terminal alarm means including:
  (i) means responsive to said signal in said medium for converting said signal to said second format;
  (ii) conditioning means having an output responsive to said signal in said second format for changing said value in said regularly recurring bit to a value opposite to said value inserted in said central office alarm means said means operating not to change said value upon the occurrence of at least one of a predetermined fault condition in said system; and
  (iii) means connected to said conditioning means output for transmitting said signal in said first format in serial fashion; and (c) means included in said central office means responsive to said signal in said first format received from said medium for converting said signal to said second format and in response thereto for comparing the value of said received bit to the value of said second format transmitted bit and for generating an alarm signal when said values are the same.

28. The alarm system of claim 27 wherein said central office alarm means further includes means responsive to each occurrence of said alarm signal for inserting in a preselected bit of said channel associated with said at least one subscriber for one frame of said information signal when said signal is in said first format, a preselected value.

29. The alarm system of claim 28 wherein said remote terminal alarm means further includes means responsive to said information signal in said medium for determining the number of consecutive frames in which said predetermined bit of said channel corresponding to said at least one subscriber has said preselected value and generating a central office alarm signal when said number of consecutive frames exceeds a predetermined number.

* * * * *